(12) United States Patent
Oh et al.

(10) Patent No.: US 12,339,553 B2
(45) Date of Patent: *Jun. 24, 2025

(54) WIDE FIELD-OF-VIEW POLARIZATION SWITCHES WITH LIQUID CRYSTAL OPTICAL ELEMENTS WITH PRETILT

(71) Applicant: Magic Leap, Inc., Plantation, FL (US)

(72) Inventors: Chulwoo Oh, Sammamish, WA (US); Ravi Kumar Komanduri, Austin, TX (US); Gary Sharp, Boulder, CO (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/774,038

(22) Filed: Jul. 16, 2024

(65) Prior Publication Data

US 2024/0369892 A1 Nov. 7, 2024

Related U.S. Application Data

(63) Continuation of application No. 17/988,598, filed on Nov. 16, 2022, now Pat. No. 12,072,596, which is a
(Continued)

(51) Int. Cl.
*G02F 1/137* (2006.01)
*G02B 27/01* (2006.01)
(Continued)

(52) U.S. Cl.
CPC ......... *G02F 1/137* (2013.01); *G02B 27/0172* (2013.01); *G02B 30/34* (2020.01);
(Continued)

(58) Field of Classification Search
CPC ...... G02F 1/137; G02F 1/0136; G02F 1/1326; G02F 1/13471; G02B 27/017;
(Continued)

(56) References Cited

U.S. PATENT DOCUMENTS 5,636,043 A 6/1997 Uemura et al.
6,850,221 B1 2/2005 Tickle
(Continued)

FOREIGN PATENT DOCUMENTS

CN 207281429 U 4/2018
EP 0640863 A2 3/1995
(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.
(Continued)

*Primary Examiner* — Nathanael R Briggs
(74) *Attorney, Agent, or Firm* — Tobias Intellectual Property Law, PLLC

(57) ABSTRACT

A switchable optical assembly comprises a switchable waveplate configured to be electrically activated and deactivated to selectively alter the polarization state of light incident on the switchable waveplate. The switchable waveplate comprises first and second surfaces and a liquid crystal layer disposed between the first and second surfaces. The liquid crystal layer comprises a plurality of liquid crystal molecules. The first surface and/or the second surface may be planar. The first surface and/or the second surface may be curved. The plurality of liquid crystal molecules may vary in tilt with respect to the first and second surfaces with outward radial distance from an axis through the first and second surfaces and the liquid crystal layer in a plurality of radial directions. The switchable waveplate can include a plurality of electrodes to apply an electrical signal across the liquid crystal layer.

15 Claims, 30 Drawing Sheets

Related U.S. Application Data continuation of application No. 17/252,024, filed as application No. PCT/US2019/037079 on Jun. 13, 2019, now Pat. No. 11,531,244.

(60) Provisional application No. 62/685,857, filed on Jun. 15, 2018.

(51) Int. Cl.
    *G02B 30/34*      (2020.01)
    *G02F 1/01*      (2006.01)
    *G02F 1/13*      (2006.01)

(52) U.S. Cl.
    CPC .......... *G02F 1/0136* (2013.01); *G02F 1/1326* (2013.01); *G02B 2027/0134* (2013.01)

(58) Field of Classification Search
    CPC .... G02B 27/0172; G02B 27/42; G02B 30/34; G02B 30/40; G02B 30/3016; G02B 6/00; G02B 2027/0134; H04N 13/332
See application file for complete search history.

(56) References Cited

U.S. PATENT DOCUMENTS

| | | |
|---|---|---|
| 7,177,001 B2 | 2/2007 | Lee |
| 7,209,205 B2 | 4/2007 | Yoshida et al. |
| 7,835,058 B2 | 11/2010 | Wen et al. |
| 9,257,141 B2 | 2/2016 | Hashimoto et al. |
| 11,009,765 B1 | 5/2021 | Lu et al. |
| 11,531,244 B2 | 12/2022 | Oh et al. |
| 12,007,652 B2 | 6/2024 | Oh et al. |
| 12,072,596 B2 | 8/2024 | Oh et al. |
| 2002/0033442 A1 | 3/2002 | Toko et al. |
| 2002/0075783 A1 | 6/2002 | Alon et al. |
| 2006/0028436 A1 | 2/2006 | Armstrong |
| 2007/0081123 A1 | 4/2007 | Lewis |
| 2009/0141216 A1 | 6/2009 | Marrucci |
| 2011/0211135 A1 | 9/2011 | Sharp et al. |
| 2012/0127062 A1 | 5/2012 | Bar-Zeev et al. |
| 2012/0162549 A1 | 6/2012 | Gao et al. |
| 2012/0274892 A1 | 11/2012 | Bonnin et al. |
| 2012/0314180 A1 | 12/2012 | Hashimoto et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0047956 A1 | 2/2016 | Tabirian et al. |
| 2016/0209692 A1 | 7/2016 | Huang et al. |
| 2018/0011239 A1 | 1/2018 | Yamaguchi |
| 2019/0025657 A1* | 1/2019 | Presniakov ....... G02F 1/133504 |
| 2021/0231986 A1 | 7/2021 | Oh et al. |
| 2021/0318566 A1 | 10/2021 | Oh et al. |
| 2023/0084882 A1 | 3/2023 | Oh et al. |
| 2024/0280860 A1 | 8/2024 | Oh et al. |

FOREIGN PATENT DOCUMENTS

| | | |
|---|---|---|
| EP | 2541308 A1 | 1/2013 |
| JP | H035133 U | 1/1991 |
| JP | H07114009 A | 5/1995 |
| JP | 2005250486 A | 9/2005 |
| JP | 2005274847 A | 10/2005 |
| JP | 2007115299 A | 5/2007 |
| JP | 2010525394 A | 7/2010 |
| JP | 2010244021 A | 10/2010 |
| JP | 5370760 B2 | 12/2013 |
| JP | 2015062062 A | 4/2015 |
| JP | 2016519327 A | 6/2016 |
| JP | 2018059913 A | 4/2018 |
| WO | 2008047800 A1 | 4/2008 |
| WO | 2013096781 A1 | 6/2013 |
| WO | 2014132781 A1 | 9/2014 |
| WO | 2019241573 A1 | 12/2019 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/ azuma/ARpresence.pdf.

Azuma, "Predictive Tracking for Augmented Realty," TR95-007, Department of Computer Science, UNC—Chapel Hill, NC, Feb. 1995.

Bimber, et al., "Spatial Augmented Reality—Merging Real and Virtual Worlds," 2005 https://web.media.mit.edu/raskar/book/BimberRaskarAugmentedRealityBook.pdf.

EP19820583.3 Examination Report dated May 30, 2023.

International Preliminary Report on Patentability for PCT Application No. PCT/US19/37077, dated Dec. 15, 2020.

International Preliminary Report on Patentability for PCT Application No. PCT/US19/37079, dated Dec. 15, 2020.

International Search Report and Written Opinion for PCT Application No. PCT/US19/37077, dated Oct. 25, 2019.

International Search Report and Written Opinion for PCT Application No. PCT/US19/37079, dated Oct. 25, 2019.

Invitation to Pay Additional Fees for PCT Application No. PCT/US19/37077, dated Aug. 15, 2019.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

JP2020-568697 Office Action mailed Apr. 7, 2023.

JP2020-569873 Office Action dated Jan. 27, 2023.

Tanriverdi and Jacob, "Interacting With Eye Movements in Virtual Environments," Department of Electrical Engineering and Computer Science, Tufts University, Medford, MA—paper/Proc. AMC CHI 2000 Human Factors in Computing Systems Conference, pp. 265-272, Addison-Wesley/ACM Press (2000).

U.S. Appl. No. 17/252,169 Office Action dated Jul. 12, 2023.

U.S. Appl. No. 17/252,169 Office Action dated Mar. 2, 2023.

* cited by examiner

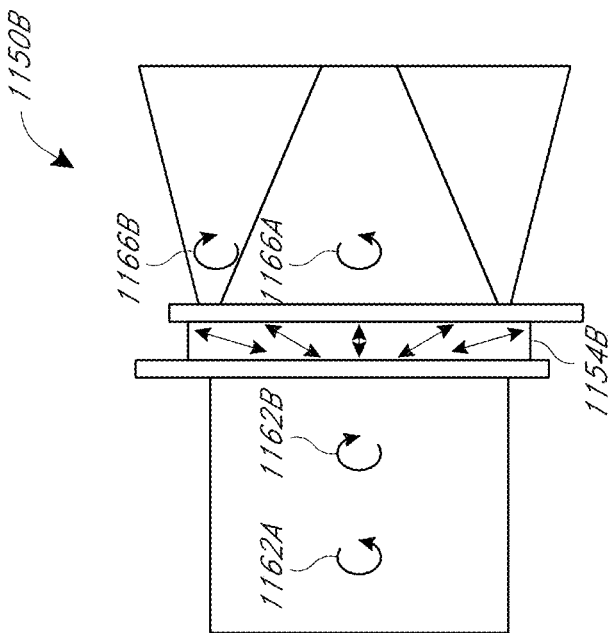
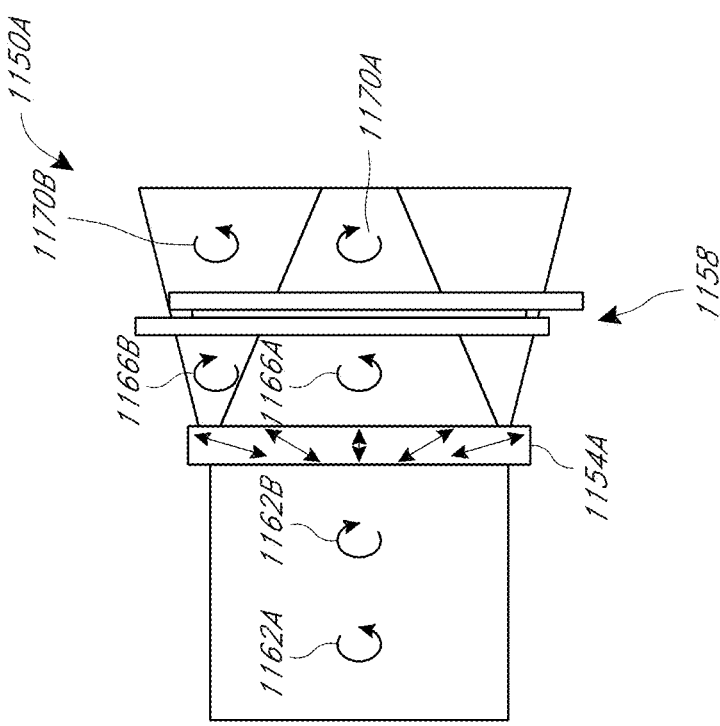
FIG. 12B
FIG. 12A

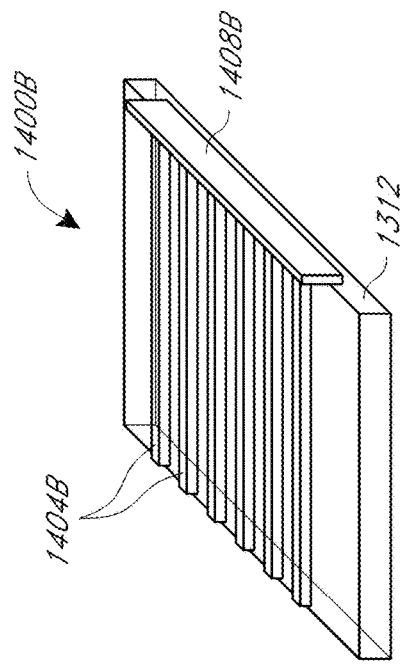
FIG. 14B
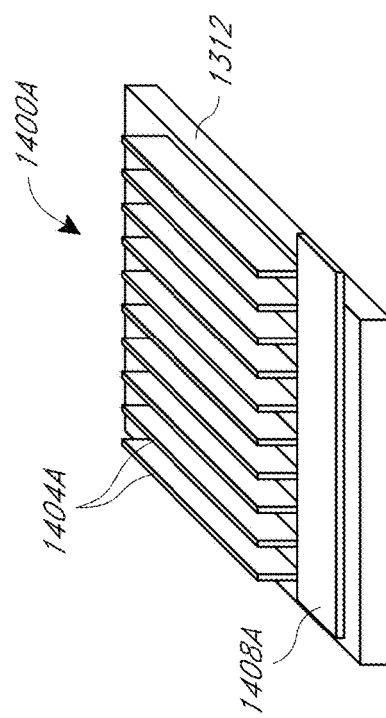
FIG. 14A
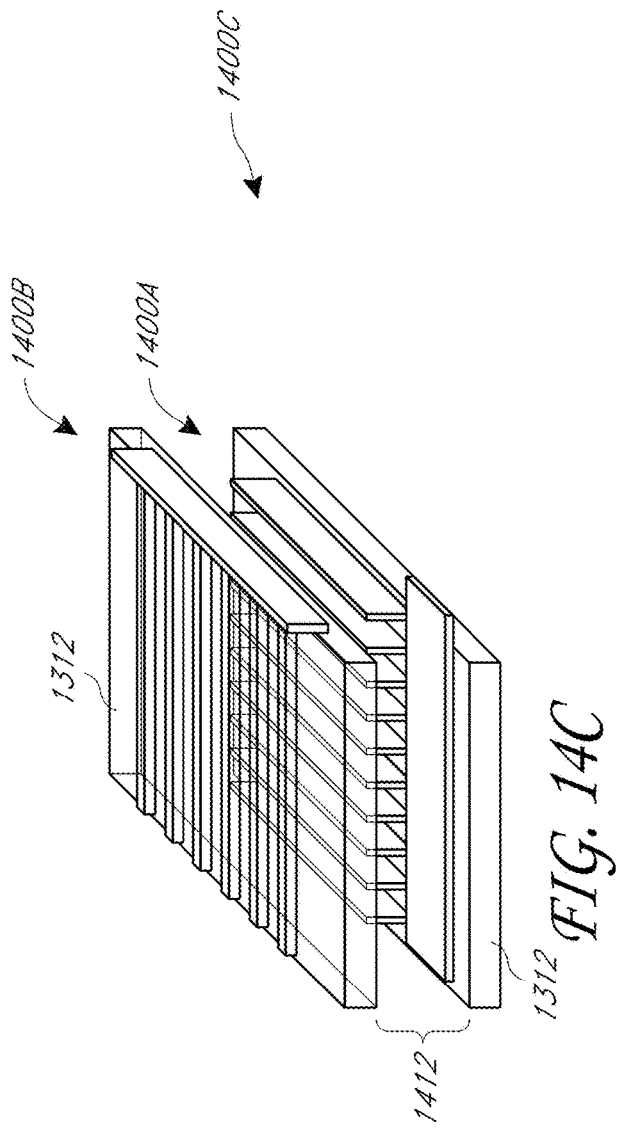
FIG. 14C
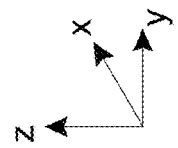

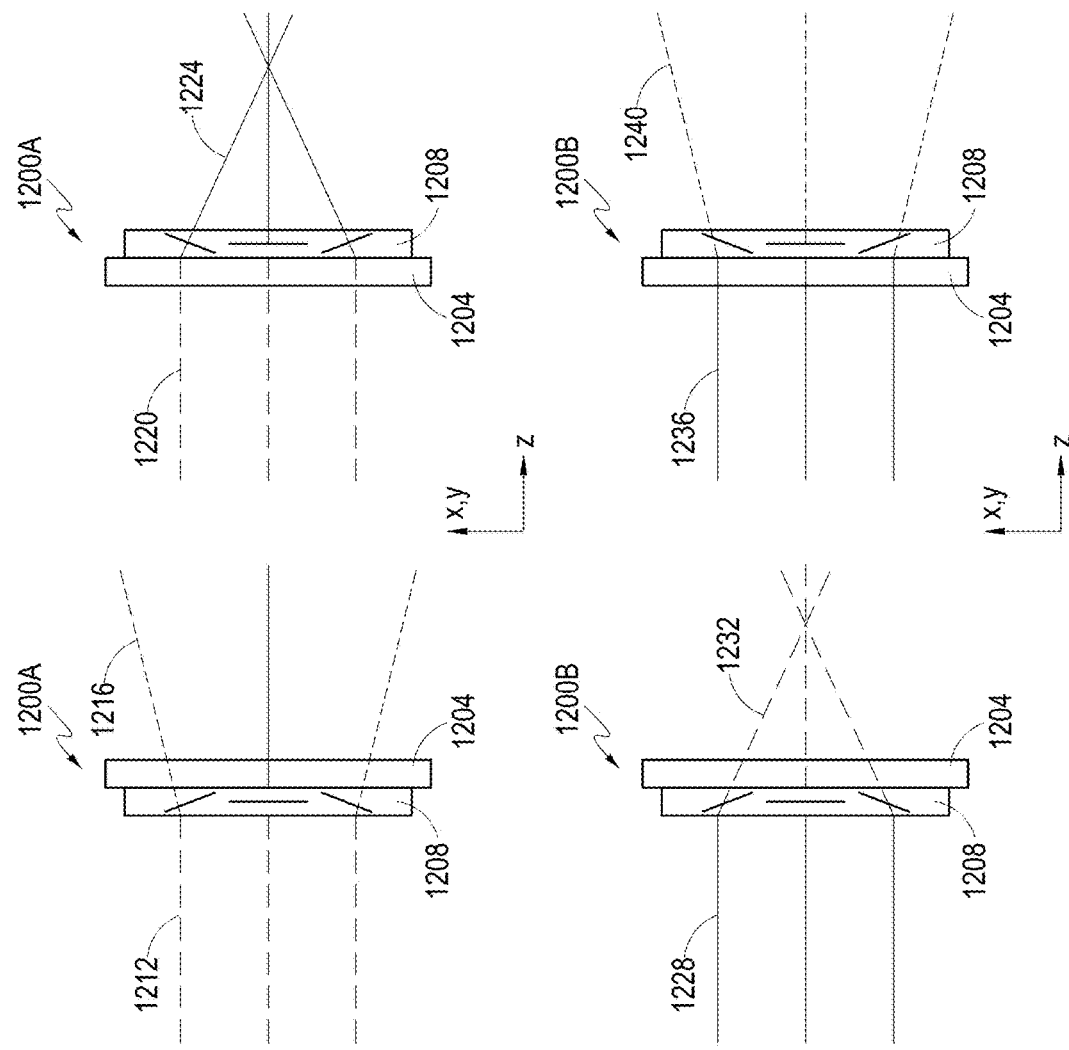

WIDE FIELD-OF-VIEW POLARIZATION SWITCHES WITH LIQUID CRYSTAL OPTICAL ELEMENTS WITH PRETILT

PRIORITY CLAIM

This application is a continuation of U.S. application Ser. No. 17/988,598 filed on Nov. 16, 2022, which is a continuation of U.S. application Ser. No. 17/252,024 filed on Dec. 14, 2020, which is a national stage entry of International Application No. PCT/US2019/037079 filed on Jun. 13, 2019, which claims the benefit of priority under 35 U.S.C. § 119 (e) of U.S. Provisional Application No. 62/685,857 filed on Jun. 15, 2018. The entire disclosure of each of the above-referenced applications is hereby incorporated by reference into this application.

INCORPORATION BY REFERENCE

This application incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; and U.S. application Ser. No. 14/331,218 filed on Jul. 14, 2014, published on Oct. 29, 2015 as U.S. Publication No. 2015/0309263.

BACKGROUND

Field

The present disclosure relates to display systems and, more particularly, to augmented and virtual reality display systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

BRIEF DESCRIPTION OF THE DRAWINGS

FIG. 12A illustrates an example of a waveplate lens assembly comprising liquid crystals.

FIG. 12B illustrates an example of a switchable waveplate lens comprising liquid crystals.

FIG. 14A illustrates a perspective view of an example of one of a pair of transparent electrodes for switching a layer of liquid crystals.

FIG. 14B illustrates a perspective view of an example of the other of a pair of transparent electrodes for switching a layer of liquid crystals.

FIG. 14C illustrates a perspective view of an example of a pair of vertically separated transparent electrodes for switching a layer of liquid crystals.

FIG. 16C illustrates an example of a waveplate lens that provides different optical power to diverge or converge light passing therethrough depending on the polarization of light and the side on which the light is incident.

FIG. 16D illustrates an example of a waveplate lens that provides different optical power to diverge or converge light passing therethrough depending on the polarization of light and the side on which the light is incident.

Figure 1:
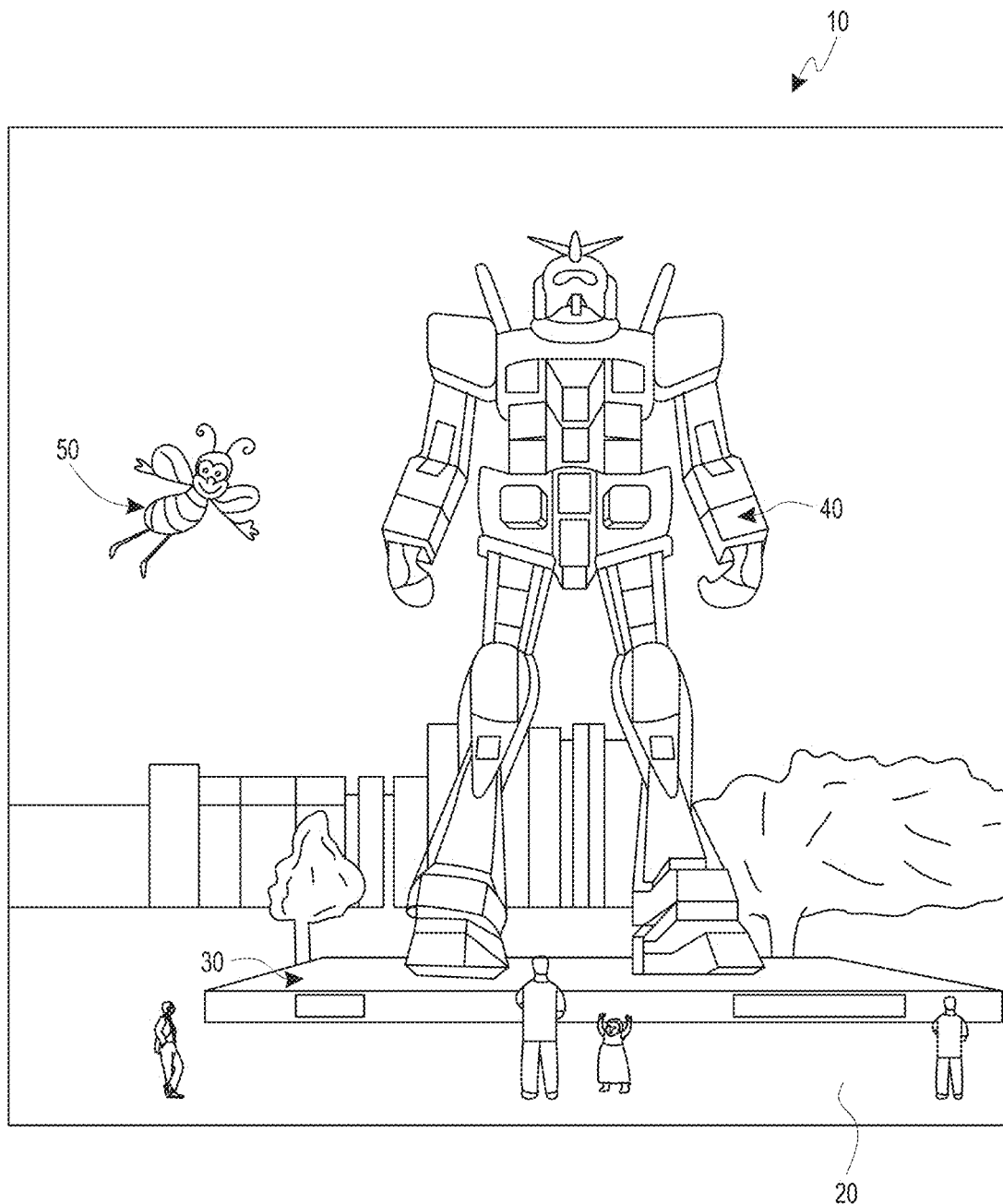
FIG. 1 illustrates a user's view of augmented reality (AR) through an AR device.

Throughout the drawings, reference numbers may be re-used to indicate correspondence between referenced elements. The drawings are provided to illustrate example embodiments described herein and are not intended to limit the scope of the disclosure.

DETAILED DESCRIPTION

AR systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" or "head mountable" display is a display that may be mounted on the head of a viewer or user.

In some AR systems, a plurality of waveguides may be configured to form virtual images at a plurality of virtual depth planes (also referred to simply a "depth planes" herein). Different waveguides of the plurality of waveguides may have different optical powers and may be formed at different distances from the user's eye. The display systems may also include a plurality lenses that provide or additionally provide optical powers. The optical powers of the waveguides and/or the lenses may provide images at different virtual depth planes. Undesirably, each of the waveguides and lenses may increase the overall thickness, weight and cost of the display.

Advantageously, in various embodiments described herein, an adaptive lens assembly may be utilized to provide variable optical power to, e.g., modify the wavefront divergence of light propagating through the lens assembly to provide virtual depth planes at different perceived distances from a user. The adaptive lens assembly may include a pair of waveplate lenses having a switchable waveplate disposed between them. Each of the first and second waveplate lenses may be configured to alter a polarization state of the light passing therethrough, and the switchable waveplate may be switchable between a plurality of states, e.g., a first state that allows light to pass without changing a polarization of the light and a second state that alters the polarization of the light (e.g., by changing the handedness of the polarization). In some embodiments, one or both of the waveplate lenses may be switchable between these first and second states and the intervening switchable waveplate noted above may be omitted.

It will be appreciated that the adaptive lens assembly may comprise a stack of a plurality of waveplate lenses and a plurality of switchable waveplates. For example, the adaptive lens assembly may comprise multiple subassemblies comprising a pair of waveplate lenses with an intervening switchable waveplate. In some embodiments, the adaptive lens assembly may include alternating waveplate lenses and switchable waveplates. Advantageously, such alternating arrangement allows a reduction in thickness and weight by having neighboring switchable waveplates share a common waveplate lens. In some embodiments, by switching the states of the various combinations of the switchable plates in the stack, more than two discrete levels of optical power may be provided.

In some embodiments, the adaptive lens assembly forms a display device with a waveguide assembly to form images at different virtual depth planes. In various embodiments, the display device comprises a pair of adaptive lens assemblies interposed by a waveguide assembly. The waveguide assembly includes a waveguide configured to propagate light (e.g., visible light) therein (e.g., via total internal reflection) and to outcouple the light. For example, the light may be outcoupled along an optical axis direction normal to a major surface of the waveguide. One of the pair of adaptive lens assemblies may be formed on a first side of the waveguide assembly and may be configured to provide variable optical power to modify the wavefront of light passing through the adaptive lens assembly to form images at each of a plurality of virtual depth planes. For example, the adaptive lens assemblies may converge or diverge outcoupled light received from the waveguide assembly. To compensate for modifications of real world views due to the convergence or divergence of ambient light propagating through the adaptive lens assembly and/or the waveguide assembly, the other of the pair of adaptive lens assemblies is additionally provided on a second side of the waveguide assembly opposite the first side. When the switchable waveplates of each adaptive lens assembly assume a corresponding state, the adaptive lens assemblies may have optical powers with opposite signs, such that the other of the adaptive lens assemblies correct for distortions caused by the adaptive lens assembly on the first side of the waveguide assembly.

Advantageously, relative to a continuously variable adaptive lens having continuously variable optical elements, utilizing a switchable waveplate that is switchable between two states simplifies the driving of the adaptive lens assembly and reduces the computational power needed to determine how to appropriately activate the adaptive lens assembly for a desired optical power. In addition, by allowing the adaptive lens assembly to modify the wavefront divergence of light outputted by a waveguide, the number waveguides needed to provide a plurality of depth planes is reduced relative to an arrangement in which each waveguide provides a particular amount of wavefront divergence.

Reference will now be made to the drawings, in which like reference numerals refer to like parts throughout. Unless indicated otherwise, the drawings are schematic not necessarily drawn to scale.

Example Display Systems

Figure 2:
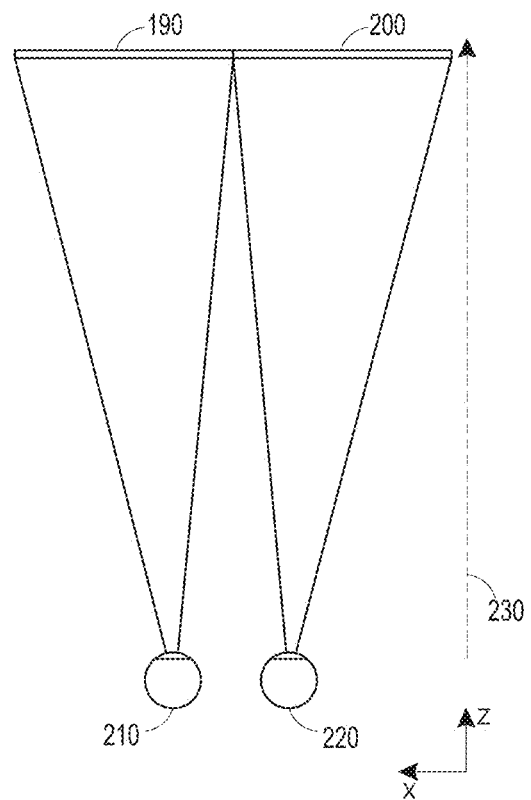
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object-one for each eye 210, 220-corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
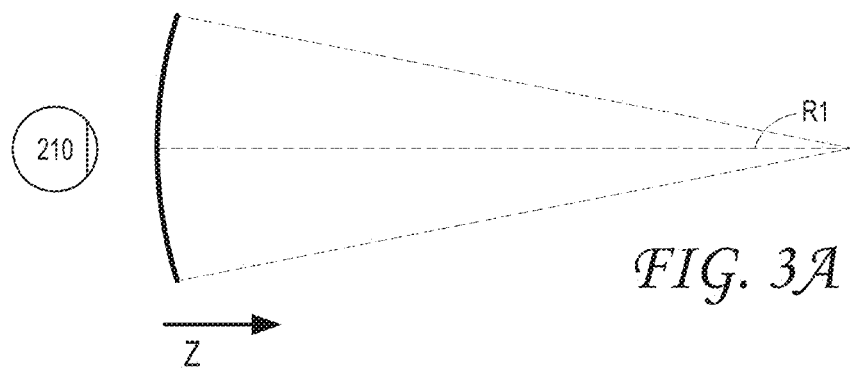
FIGS. 3A-3C illustrate relationships between radius of curvature and focal radius.
Figure 3B:
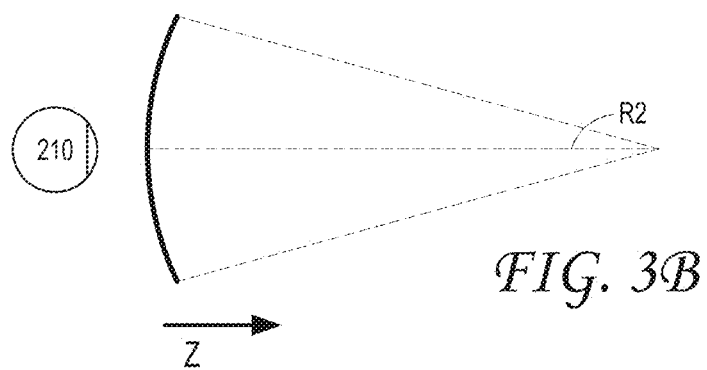
Figure 3C:
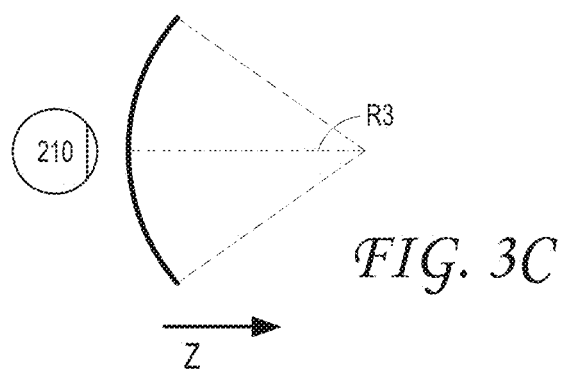

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
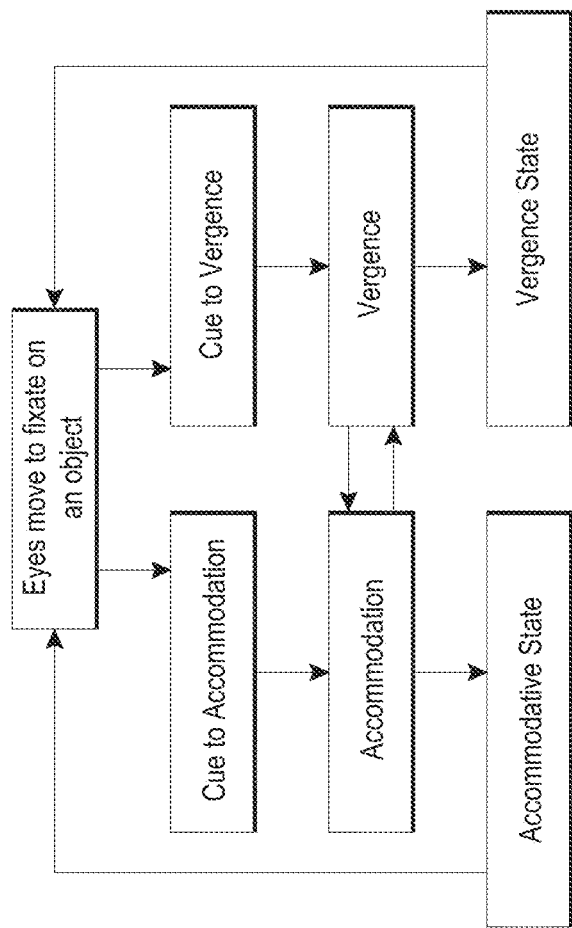
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
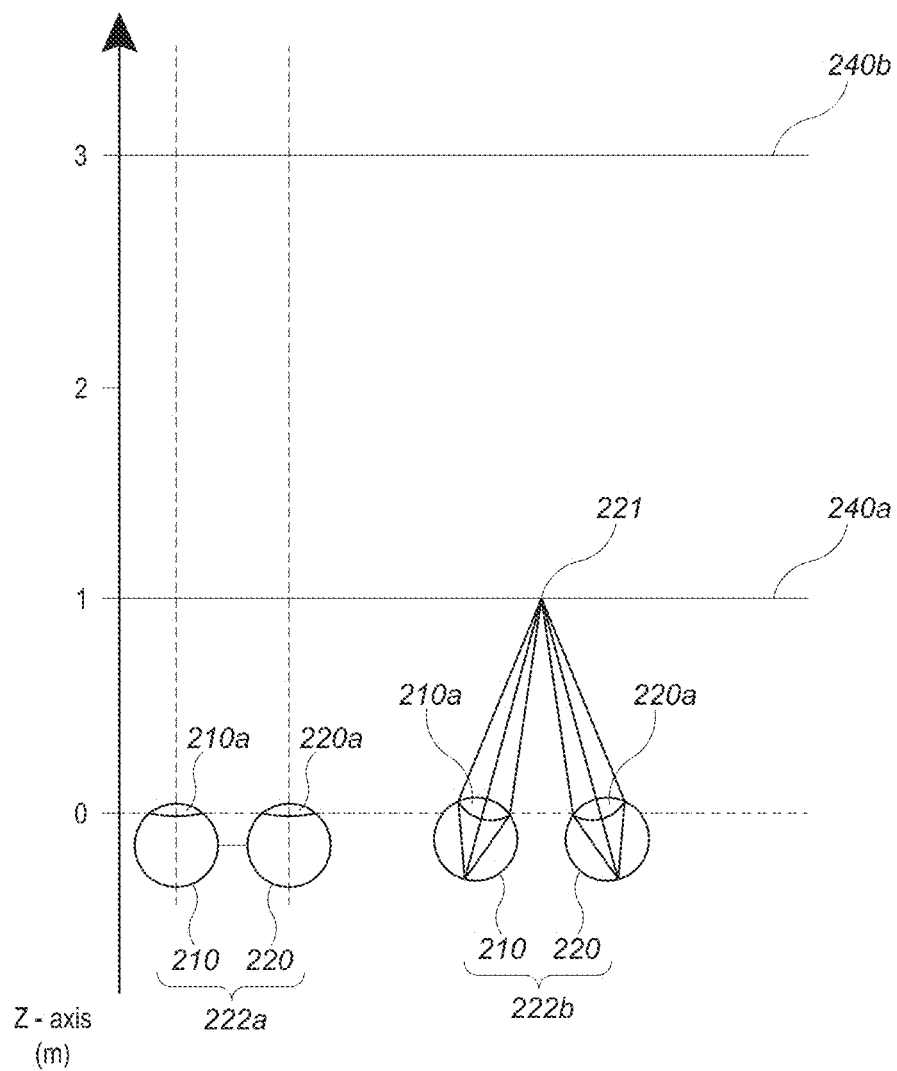
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
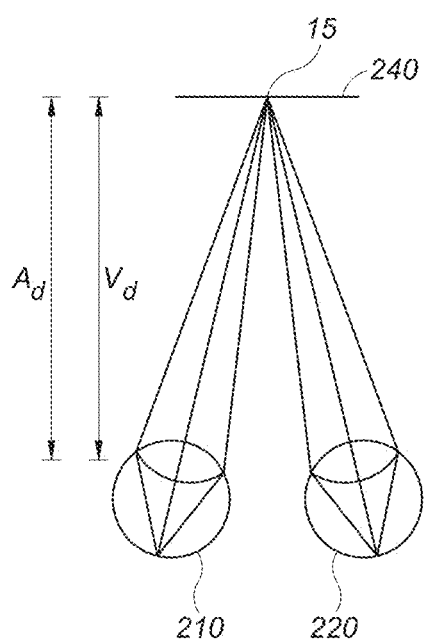
FIG. 4C illustrates an example of a representation of a top-down view of a user viewing content via a display system.
Figure 4D:
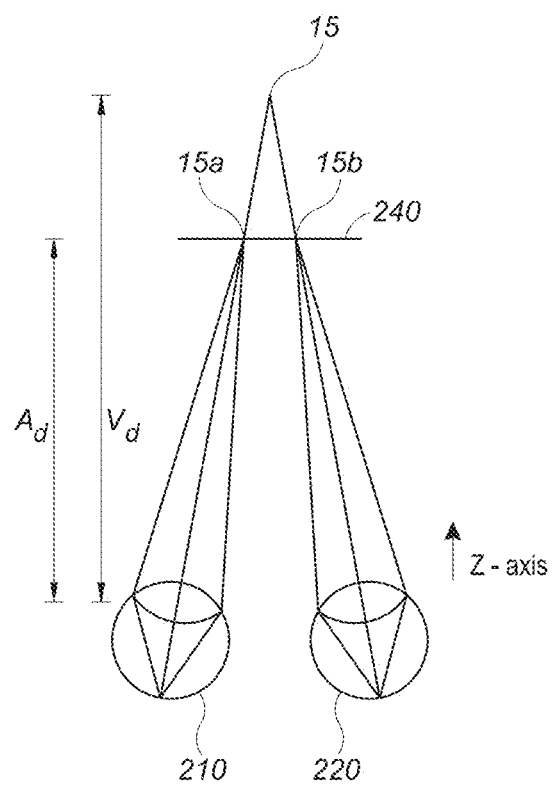
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, Va, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $Va-A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
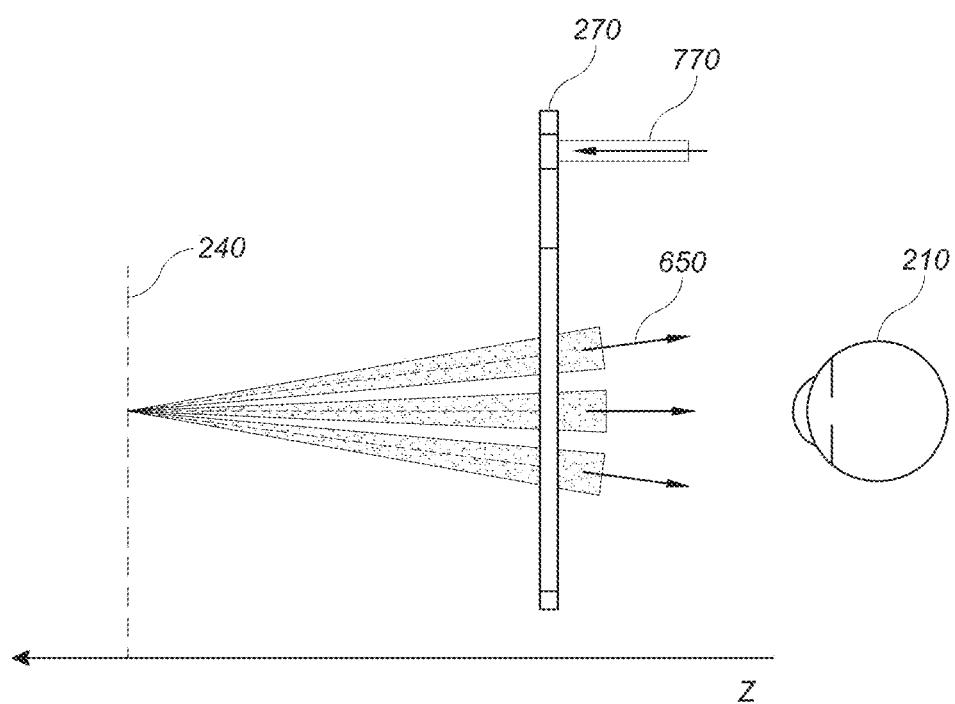
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
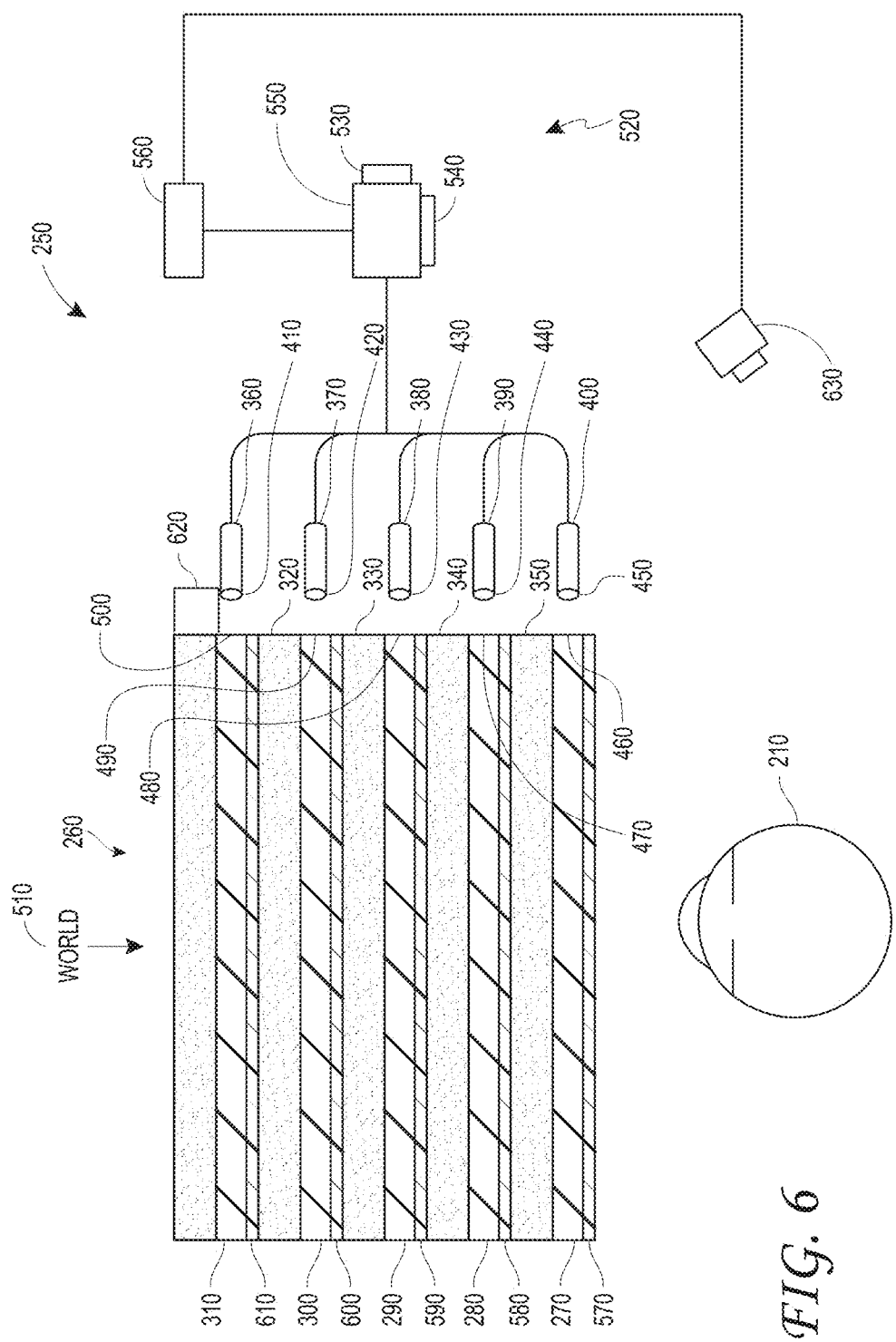
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g., a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as an ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
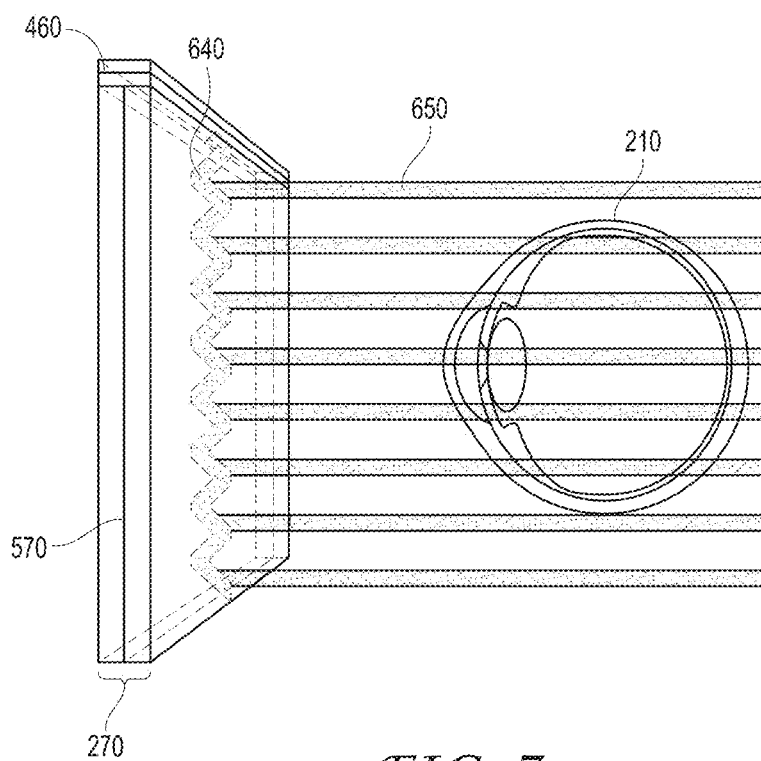
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
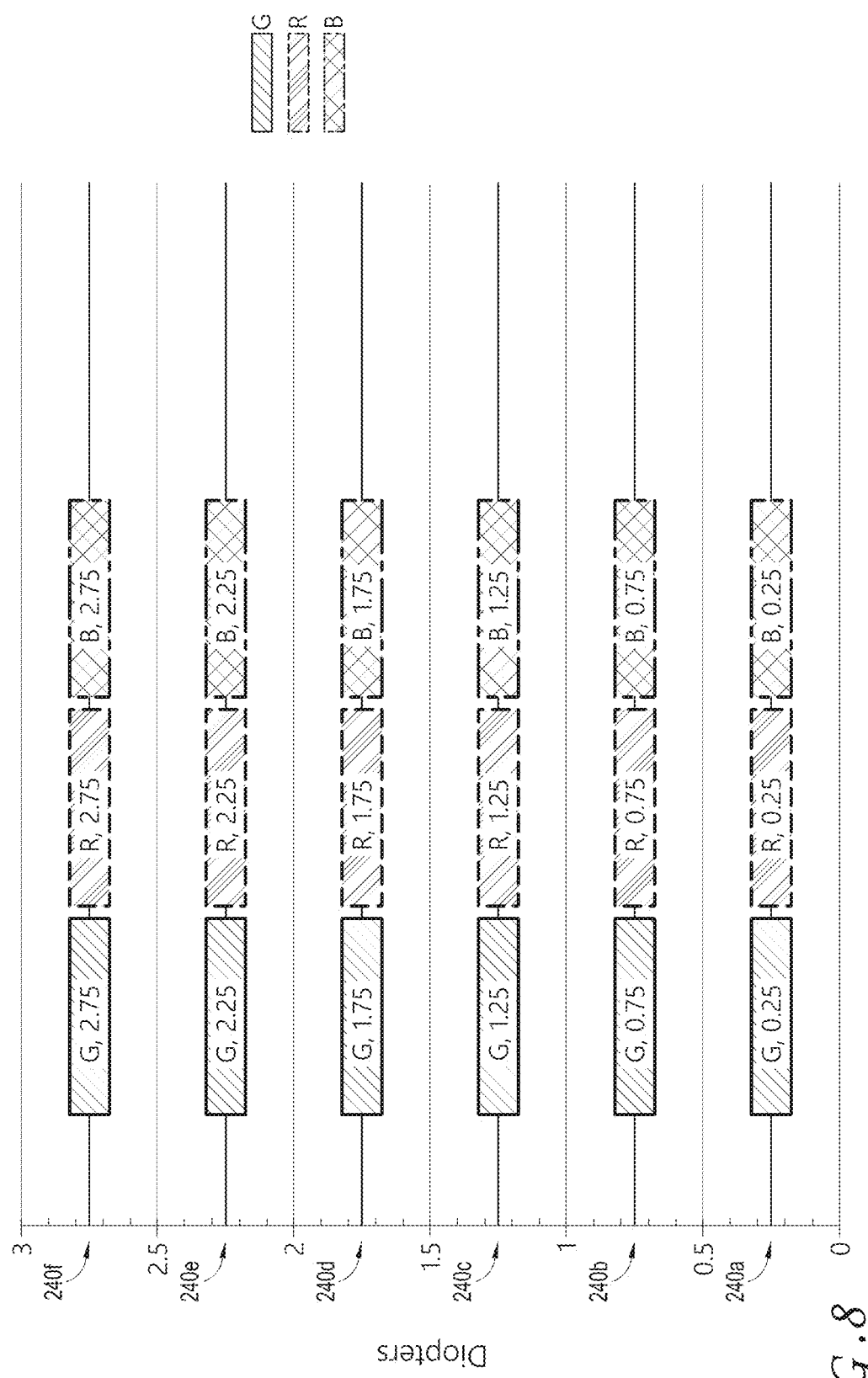
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
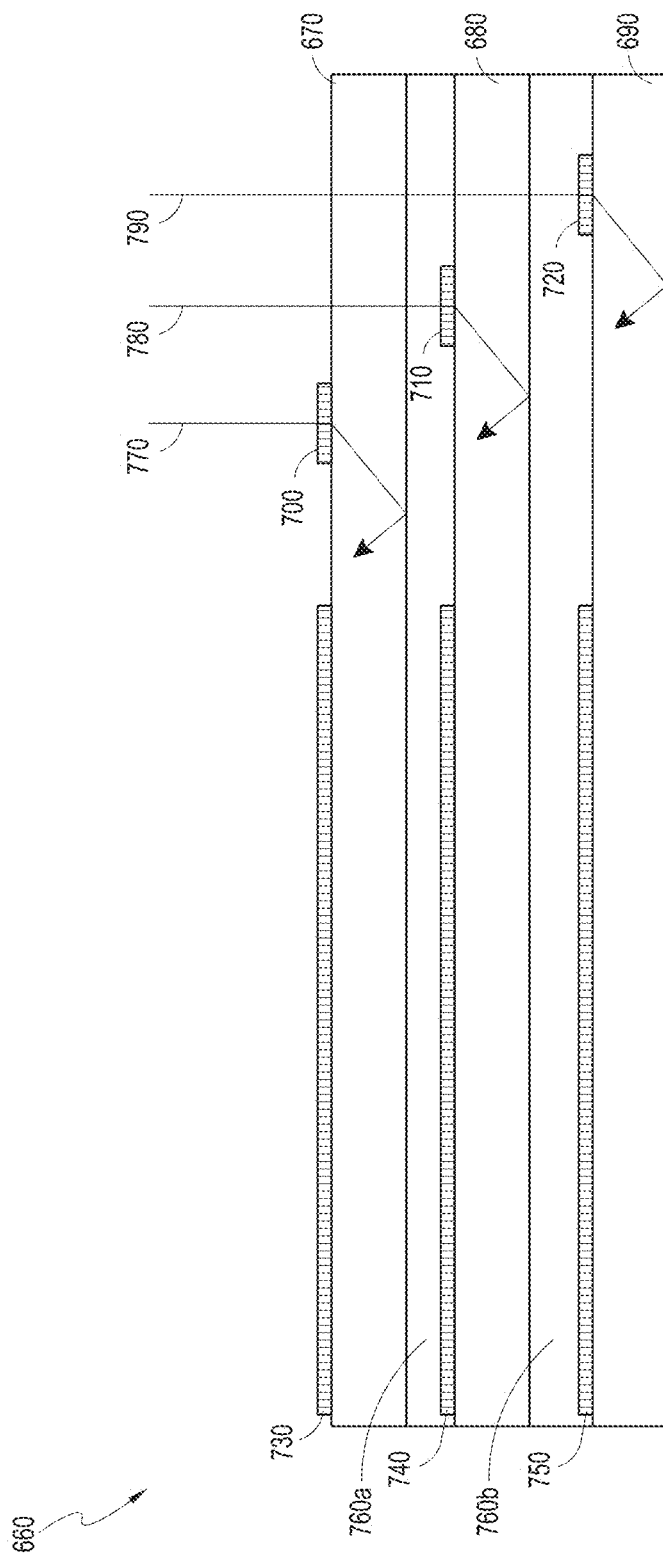
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
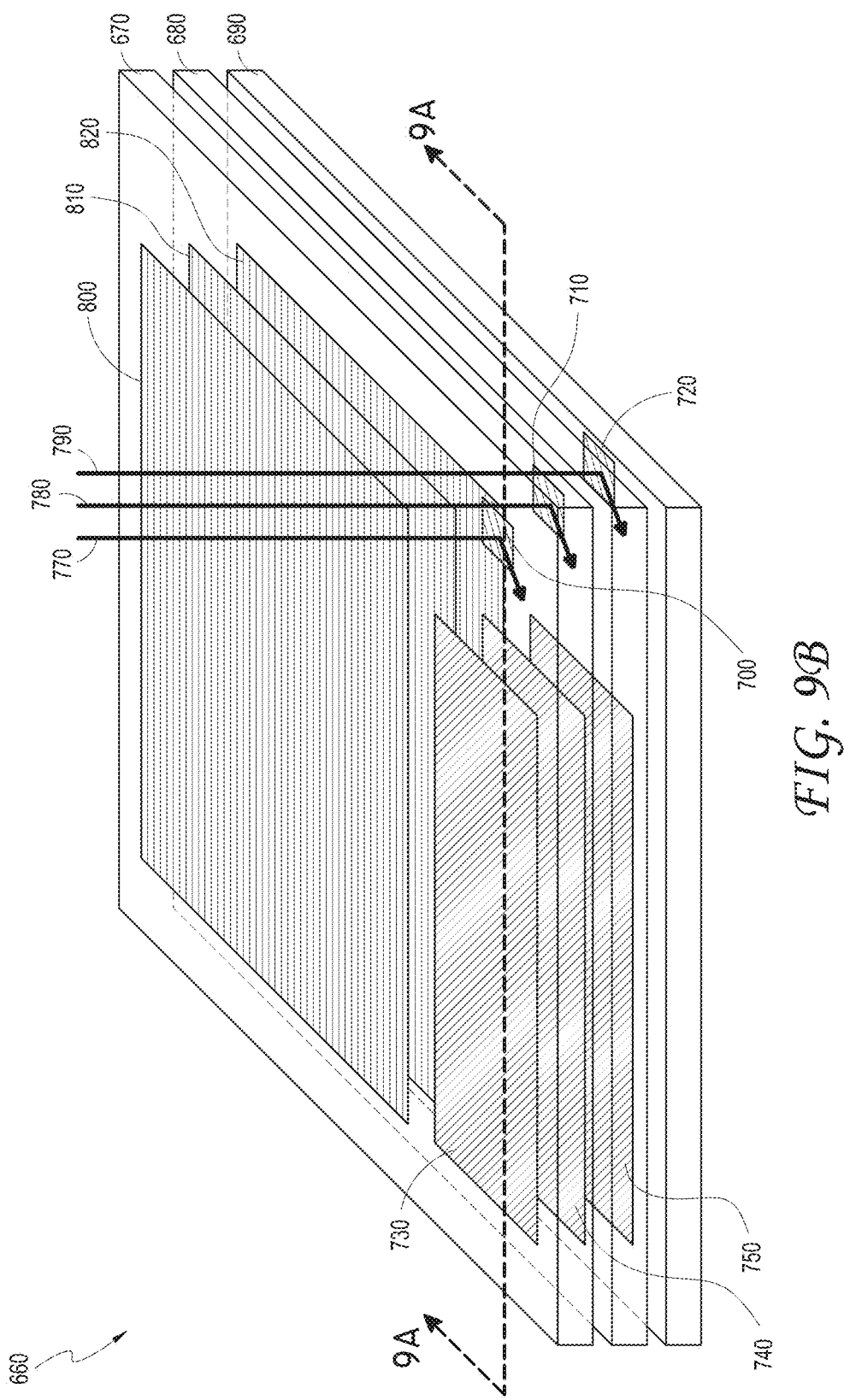
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPEs). In some embodiments, the OPEs deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EPs) or exit pupil expanders (EPEs) that direct light in a viewer's eye 210 (FIG. 7). It will be appreciated that the OPEs may be configured to increase the dimensions of the eye box in at least one axis and the EPEs may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPEs) 730, 740, 750; and out-coupling optical elements (e.g., EPs) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPEs) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EPs) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
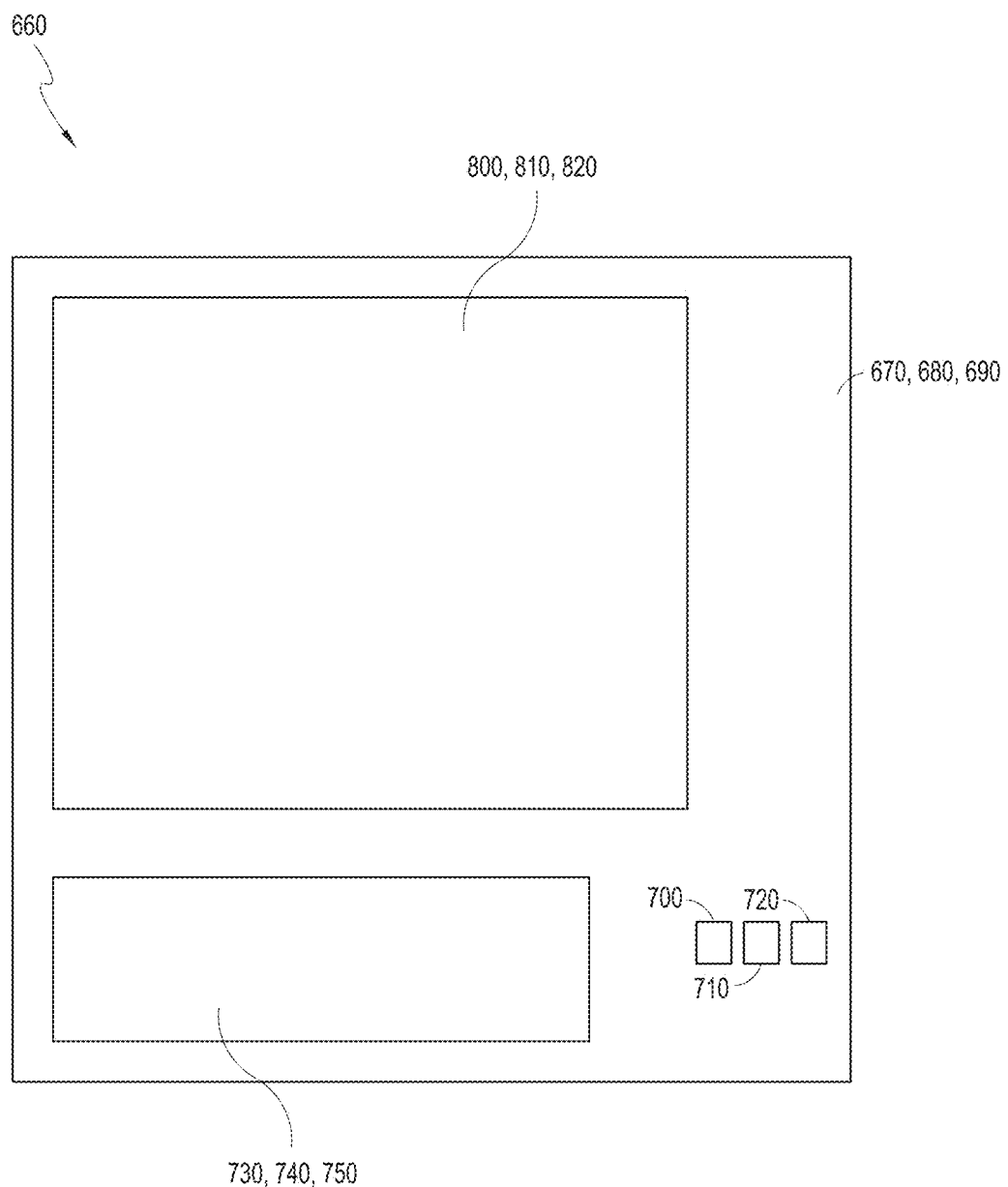
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
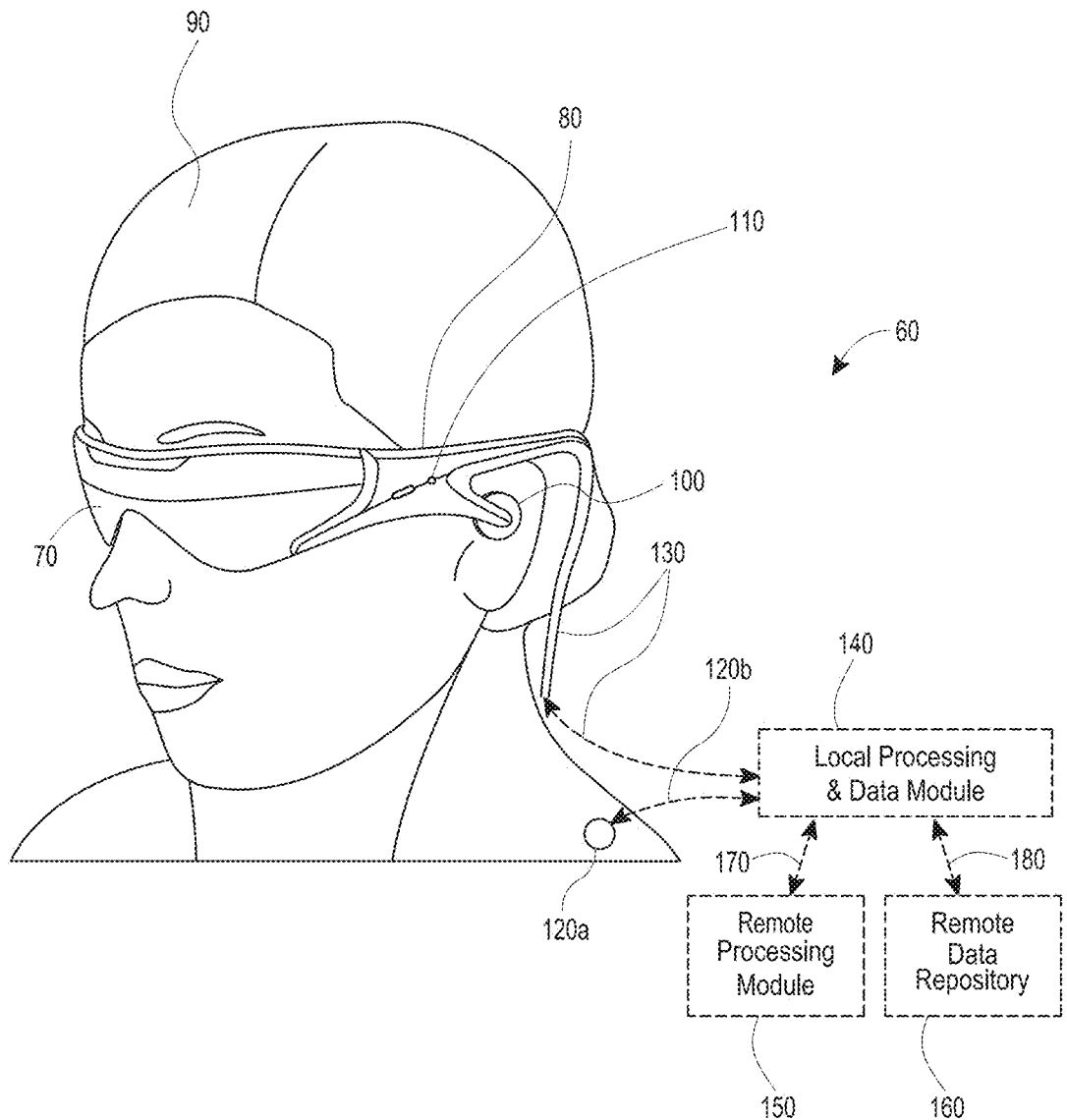
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Liquid Crystal Materials for Broadband Adaptive Waveplate Lens Assemblies

Generally, liquid crystals possess physical properties that may be intermediate between conventional fluids and solids. While liquid crystals are fluid-like in some aspects, unlike most fluids, the arrangement of molecules within liquid crystals exhibits some structural order. Different types of liquid crystals include thermotropic, lyotropic, and polymeric liquid crystals. Thermotropic liquid crystals disclosed herein can be implemented in various physical states, e.g., phases, including a nematic state/phase, a smectic state/phase, a chiral nematic state/phase or a chiral smectic state/phase.

As described herein, liquid crystals in a nematic state or phase can have calamitic (rod-shaped) or discotic (disc-shaped) organic molecules that have relatively little positional order, while having a long-range directional order with their long axes being roughly parallel. Thus, the organic molecules may be free to flow with their center of mass positions being randomly distributed as in a liquid, while still maintaining their long-range directional order. In some implementations, liquid crystals in a nematic phase can be uniaxial; i.e., the liquid crystals have one axis that is longer and preferred, with the other two being roughly equivalent. In some implementations, the liquid crystal molecules orient their long axis. In other implementations, liquid crystals can be biaxial; i.e., in addition to orienting their long axis, the liquid crystals may also orient along a secondary axis.

As described herein, liquid crystals in a smectic state or phase can have the organic molecules that form relatively well-defined layers that can slide over one another. In some implementations, liquid crystals in a smectic phase can be positionally ordered along one direction. In some implementations, the long axes of the molecules can be oriented along a direction substantially normal to the plane of the liquid crystal layer, while in other implementations, the long axes of the molecules may be tilted with respect to the direction normal to the plane of the layer.

Herein and throughout the disclosure, nematic liquid crystals are composed of rod-like molecules with the long axes of neighboring molecules approximately aligned to one another. To describe this anisotropic structure, a dimensionless unit vector n called the director, may be used to describe the direction of preferred orientation of the liquid crystal molecules.

Herein and throughout the disclosure, an azimuthal angle or a rotation angle $\varphi$ is used to describe an angle of rotation of a liquid crystal molecule about a layer normal direction, or an axis normal to a major surface of a liquid crystal layer, which is measured in a plane parallel to a major surface of the liquid crystal layers or of the substrate, e.g., the x-y plane, and measured between an alignment direction, e.g., an elongation direction or the direction of the director, and a direction parallel to the major surface, e.g., the y-direction.

Herein and throughout the disclosure, when an angle such as the rotation angle $\varphi$ referred to as being substantially the same or different between different regions, it will be understood that the average angles can, for example, be within about 1%, about 5% or about 10% of each other although the average angles can be larger in some cases.

As describe herein, some liquid crystals in a nematic state or a smectic state can also exhibit a twist in a layer normal direction. Such liquid crystals are referred to as being twisted nematic (TN) liquid crystals or twisted smectic (SN) liquid crystals. TN or SN liquid crystals can exhibit a twisting of the molecules about an axis perpendicular to the director, with the molecular axis being parallel to the director. When the degree of twist is relatively large, twisted liquid crystals may be referred to as being in a chiral phase or a cholesteric phase.

As described herein, TN or SN liquid crystals can be described as having a twist angle or a net twist angle (q), which can refer to, for example, the relative azimuthal angular rotation between an uppermost liquid crystal molecule and a lowermost liquid crystal molecule across a specified length, e.g., the thickness of the liquid crystal layer.

As described herein, "polymerizable liquid crystals" may refer to liquid crystal materials that can be polymerized, e.g., in-situ photopolymerized, and may also be described herein as reactive mesogens (RM).

The liquid crystal molecules may be polymerizable in some embodiments and, once polymerized, may form a large network with other liquid crystal molecules. For example, the liquid crystal molecules may be linked by chemical bonds or linking chemical species to other liquid crystal molecules. Once joined together, the liquid crystal molecules may form liquid crystal domains having substantially the same orientations and locations as before being linked together. The term "liquid crystal molecule" may refer to both the liquid crystal molecules before polymerization and to the liquid crystal domains formed by these molecules after polymerization. Once polymerized, the polymerized network may be referred to as liquid crystal polymer (LCP).

In some embodiments, unpolymerized liquid crystal molecules or polymerizable liquid crystal molecules prior to being polymerized may have at least limited rotational degree of freedom. These unpolymerized liquid crystal molecules can rotate or tilt, e.g., under an electrical stimulus, which results in alteration of the optical properties. For example, by applying an electric field, some liquid crystal layers including unpolymerized liquid crystal molecules may be switched between one or more states having different diffractive or polarization altering properties.

The inventors have recognized that the above-described properties of liquid crystals or reactive mesogens (RMs) can be advantageously applied to various components of broadband switchable waveplates and waveplate lenses disclosed herein. For example, in some unpolymerized RMs, the orientations of LC molecules can be altered after deposition, e.g., by application of an external stimulus, e.g., electric field. Based on this recognition, the inventors disclose herein waveplates and waveplate lenses that can be switched between a plurality of states by application of an external stimulus.

In addition, the inventors have recognized that, when unpolymerized, the orientations of LC molecules at surfaces or interfaces of some LCs or RMs can be aligned by controlling the surface or interface on which the LC molecules are formed. For example, a stack of multiple LC layers can be formed where, by controlling orientations of LC molecules closest to the surface of an LC layer, orientations of immediately adjacent LC molecules in the next LC layer can be controlled, e.g., to have the same orientation as the LC molecules closest to the surface in the previous LC layer or same orientation as elongated microstructures in adjacent layers. In addition, LC molecules between the LC molecules at surfaces or interfaces can be controlled to have a predetermined amount of twist. Based on recognition of these and other attributes including birefringence, chirality, and ease for multiple-coating, the inventors disclose herein waveplates and waveplate lenses that have useful properties such as broadband capability with tailored optical properties, e.g., diffraction efficiency, optical power and polarizability, to name a few.

Display Devices Having Switchable Broadband Adaptive Waveplate Lens Assemblies

As described supra in reference to FIG. 6, some display systems according to embodiments include a waveguide assembly 260 configured to form images at a plurality of virtual depth planes. The waveguide assembly 260 includes waveguides 270, 280, 290, 300, 310 each configured to propagate light by total internal reflection (TIR), and includes out-coupling optical elements 570, 580, 590, 600, 610 each configured to extract light out of a respective one of the waveguides 270, 280, 290, 300, 310 by redirecting the light. Each of the waveguide 270, 280, 290, 300, 310 is configured to output light to form an image corresponding to a particular depth plane. The waveguide assembly 260 may also optionally include a plurality of lenses 320, 330, 340, 350 between the waveguides for providing different optical powers for forming the images at different virtual depth planes.

In the illustrated embodiment of the waveguide assembly 260 in FIG. 6, the number of depth planes may be directly proportional to the number of waveguides and lenses. However, the inventors have recognized various challenges associated with implementing a waveguide assembly configured for displaying images at a plurality of depth planes by having a proportional number of waveguides and lenses. For example, a high number of waveguides 270, 280, 290, 300, 310 and a high number of corresponding lenses 320, 330, 340, 350 can undesirably increase the overall thickness, weight, cost, and manufacturing challenges to the waveguide assembly 260. For example, when formed of a conventional lens material, e.g., glass, each of the lenses 320, 330, 340, 350 may add millimeters or tens of millimeters in thickness and corresponding weight to the displays. In addition, a high number of waveguides and lenses can produce undesirable optical effects to the user, e.g., relatively high absorption loss. Thus, in one aspect, the inventors have recognized a potential benefit in some cases for display systems that can generate images at a plurality of depth planes with fewer numbers of waveguides, fewer number of lenses, thinner and lighter waveguides and lenses and/or fewer numbers of lenses per waveguide.

Still referring to FIG. 6, it will be appreciated that the lenses 320, 330, 340, 350 may be configured to form images at different depth planes by exerting respective optical powers to light from the waveguides 310, 300, 290 and 280. In various embodiments, the light outcoupled from the waveguides may have a polarization, e.g., a circular polarization. However, when polarized light outcoupled from a waveguide passes through a waveplate lens or a waveplate formed of liquid crystals, less than 100% of the outcoupled light transmitted therethrough may be optically affected, e.g., diffractively diverged, converged or altered in polarization, resulting in a portion of the outcoupled light passing through without being optically affected. The light passing through the lens without being optically affected in this manner is sometimes referred to as leakage light. The leakage light may be undesirably focused, defocused or altered in polarization in the downstream optical path, or not be affected at all. When a significant portion of the light passing through a waveplate or waveplate lens constitutes leakage light, a user may experience undesirable effects, such as, "ghost" images, which are unintended images or images that become visible to the user at unintended depth planes. The inventors have recognized that such leakage light may result from, among other causes, the waveplate lenses or waveplates formed of liquid crystals being configured to have a relatively high diffraction efficiency within a relatively narrow range of wavelengths in the visible spectrum. Thus, in another aspect, the inventors have recognized a need for a broadband adaptive waveplate lens assembly that can generate images at a plurality of depth planes with less undesirable effects arising from leakage light over a wide range of wavelengths in the visible spectrum. To address these and other needs, various embodiments include broadband adaptive waveplate lens assemblies comprising switchable waveplate lenses or switchable waveplates based on liquid crystals, which are configured to provide variable optical power. The waveplate lenses and waveplates formed of liquid crystals can provide various advantages towards achieving these objectives, including small thickness, light weight and high degree of configurability at the molecular level. In various embodiments described herein, display devices are configured to form images at different virtual depth planes using a waveguide assembly configured to guide light in a lateral direction parallel to an output surface of a waveguide and to outcouple the guided light through the output surface to one or more broadband adaptive waveplate lens assemblies. In various embodiments, a broadband adaptive waveplate lens assembly is configured to incouple and to diffract therethrough the outcoupled light from the waveguide. The broadband adaptive lens assembly includes a first waveplate lens comprising a liquid crystal (LC) layer arranged such that the waveplate lens has birefringence ($\Delta n$) that varies in a radially outward direction from a central region of the first waveplate lens is configured to diffract the outcoupled light at a diffraction efficiency greater than 90%, greater than 95% or even greater than 99% within a broadband wavelength range including at least 450 nm to 630 nm. In some embodiments, the broadband adaptive waveplate lens assemblies according to embodiments are significantly lighter and thinner (microns) compared to conventional lenses, and can advantageously provide variable optical power over a broadband wavelength range. Advantageously, such broadband adaptive lens assemblies may reduce the number, thickness and weight of a waveguide assembly such as the waveguide assembly 260 (FIG. 6), as well as reducing or eliminating undesirable effects arising from leakage light.

As used herein, optical power (P, also referred to as refractive power, focusing power, or convergence power) refers to the degree to which a lens, mirror, or other optical system converges or diverges light. It is equal to the reciprocal of the focal length of the device: P=1/f. That is, high optical power corresponds to short focal length. The SI unit for optical power is the inverse meter ($m^{-1}$), which is commonly called the diopter (D).

As described herein, converging lenses that focus light passing therethrough are described as having a positive optical power, while diverging lenses that defocus light passing therethrough are described as having a negative power. Without being bound by theory, when light passes through two or more thin lenses that are relatively close to each other, the optical power of the combined lenses may be approximated as a sum of the optical powers of the individual lenses. Thus, when light passes through a first lens having a first optical power P1 and further passes through a second lens having a second optical power P2, the light may be understood to converge or diverge according to a sum of optical powers Pnet=P1+P2.

A medium having a refractive index that depends on the polarization and propagation direction of light is referred to be birefringent (or birefractive). As described throughout the specification and understood in the relevant industry, light whose polarization is perpendicular to the optic axis of a birefringent medium is described as having an ordinary refractive index ($n_o$), light whose polarization is parallel to the optic axis of the birefringent medium is described as having an extraordinary refractive index ($n_e$), and a difference of the refractive indices $n_e$-$n_o$ observed in the birefringent medium material is described as having a birefringence $\Delta n$. The phase retardation of light in a material medium having birefringence $\Delta n$ can be expressed as $\Gamma=2\pi\Delta nd/\lambda$ at different $\lambda$, where d is the thickness of the medium.

Generally, optically anisotropic materials, e.g., liquid crystals, display a positive dispersion of birefringence ($\Delta n$) decreasing with a longer wavelength of light $\lambda$. The positive dispersion of $\Delta n$ results in different phase retardation $\Gamma=2\pi\Delta nd/\lambda$ at different $\lambda$, where d is the thickness of the medium. As disclosed herein, an anisotropic material displaying a negative dispersion of birefringence ($\Delta n$) refers to a material in which the birefringence increases with a longer wavelength of light $\lambda$.

As described above, the wavelength dependence of diffraction efficiency of a waveplate lens or a waveplate can be an important consideration in reducing or minimizing various undesirable optical effects. As described herein, diffraction efficiency (η) of a birefringent medium such as a layer of liquid crystals can be expressed as $\eta=\sin^2(\pi\Delta nd/\lambda)$, where $\Delta n$ is birefringence, $\lambda$ is wavelength and d is the thickness. Because phase retardation that light propagating through the diffractive components varies with the wavelength for conventional birefringent media, some diffractive components including waveplate lenses and waveplates show a relatively narrow range of wavelengths, or bandwidth, within the visible spectrum in which diffraction efficiency is sufficiently high. In contrast, waveplate lenses and waveplates according to embodiments display a relatively wide range of wavelengths, or bandwidth, within the visible spectrum in which diffraction efficiency is sufficiently high for various applications described herein.

According to various embodiments, a broadband waveplate lens or a waveplate may be described as having a normalized bandwidth ($\Delta\lambda/\lambda_0$), where $\lambda_0$ is a center wavelength within the visible spectrum spanning a wavelength range of about 400-800 nm, including one or more of a red spectrum having a wavelength range of about 620-780 nm, a green spectrum having a wavelength range of about 492-577 nm and a blue spectrum having a wavelength range of about 435-493 nm, and $\Delta\lambda$ is a range of wavelengths centered about the $\lambda_0$ within which a diffraction efficiency exceeds 70%, 80%, 90%, 95%, 99% or by any value within a range defined by these values.

According to various embodiments, when a waveplate lens or a waveplate is described as being a broadband waveplate lens or a broadband waveplate, it will be understood as having an average, an instantaneous, a mean, a median or a minimum value of diffraction efficiency which exceeds 70%, 80%, 90%, 95%, 99% or a percentage within any of these values, within at least a portion of a visible spectrum spanning a wavelength range of about 400-800 nm, including one or more of a red spectrum which includes wavelengths in the range of about 620-780 nm, a green spectrum which includes wavelengths in the range of about 492-577 nm, and a blue spectrum in the range of about 435-493 nm, or within a range of wavelengths defined by any wavelength within the visible spectrum within about 400-800 nm, e.g., 400-700 nm, 430-650 nm or 450-630 nm.

Based on the relationship $\eta=\sin^2(\pi\Delta nd/\lambda)$ described above for diffraction efficiency, a broadband waveplate lens or a waveplate can have an efficiency for a fixed d when the ratio of $\Delta n/\lambda$ has a positive and relatively constant value. As described herein, a medium having a positive ratio value of $\Delta n/\lambda$ is referred to as a having a negative dispersion. According to embodiments, broadband waveplate lenses or broadband waveplates described herein have negative dispersion, or a birefringence ($\Delta n$) that increases with increasing wavelength ($\lambda$) within wavelength ranges described above.

According to various embodiments, a broadband waveplate lens or a waveplate may be described as having an instantaneous, a mean, a median, a minimum or a maximum value of the ratio $\Delta n/\lambda$ that is a positive value within any range of the visible spectrum described above. In addition, a broadband waveplate lens or the waveplate has a relatively high ratio of $\Delta\lambda/\lambda_0$, where $\Delta\lambda$ is a wavelength range within any range of the visible spectrum described above and $\lambda_0$ is a centroid wavelength within the $\Delta\lambda$. According to various embodiments, a high normalized bandwidth $\Delta\lambda/\lambda_0$ can have a value of about 0.3-1.0, 0.3-0.7, 0.4-0.7, 0.5-0.7, 0.6-0.7 or a value within any range defined by these values. In addition, the broadband waveplate lens or the waveplate has a ratio $\Delta n/\lambda$ that is relatively constant within various wavelength ranges within the visible spectrum described above. For example, the ratio $\Delta n/\lambda$ can have a deviation, e.g., a standard deviation, from a mean, a median, a minimum or a maximum value of the ratio $\Delta n/\lambda$ that does not exceed more than 30%, 20%, 10%, 5%, 1% or a percentage within any of these values.

As described herein, a "transmissive" or "transparent" structure, e.g., a transparent substrate, may allow at least some, e.g., at least 20, 30, 50, 70 or 90%, of an incident light, to pass therethrough. Accordingly, a transparent substrate may be a glass, sapphire or a polymeric substrate in some embodiments. In contrast, a "reflective" structure, e.g., a reflective substrate, may reflect at least some, e.g., at least 20, 30, 50, 70, 90% or more of the incident light, to reflect therefrom.

Figure 10:
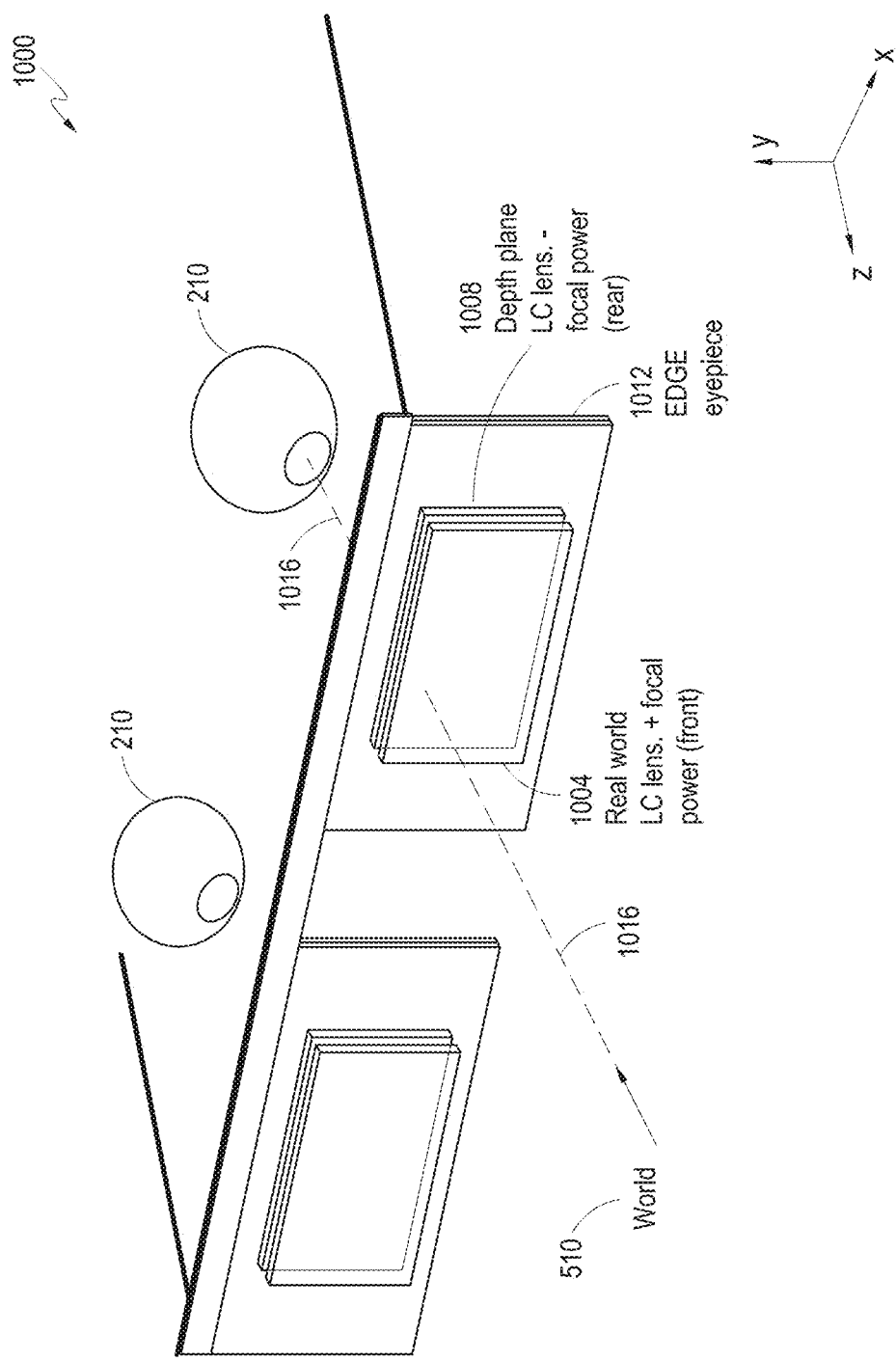
FIG. 10 illustrates an example of a display system comprising a pair of adaptive lens assemblies.

FIG. 10 illustrates an example of a display device 1000, e.g., a wearable display device, comprising one or more broadband adaptive lens assemblies, e.g., a pair of broadband adaptive lens assemblies 1004, 1008 in an optical path 1016 that are interposed by a waveguide assembly 1012. As described supra, the waveguide assembly includes a waveguide configured to propagate light (e.g., visible light) under total internal reflection and to outcouple the light in an optical axis extending from (e.g., in a direction normal to) a light output surface of the waveguide (e.g., a major surface of the waveguide). The light may be outcoupled by a diffraction grating in some embodiments. Each of the broadband adaptive lens assemblies 1004, 1008 may be configured to at least partially transmit outcoupled light therethrough. In the illustrated embodiments, each of the adaptive lens assemblies may be configured to receive outcoupled light from the waveguide assembly 1012 and to converge or diverge the outcoupled light in the optical axis direction. Each of the broadband adaptive lens assemblies 1004, 1008 comprises a waveplate lens comprising liquid crystals arranged such that the waveplate lens has birefringence ($\Delta n$) that varies in a radial direction from a central region of the waveplate lens and that decreases with increasing wavelength ($\lambda$) within a range of the visible spectrum. The broadband adaptive lens assembly is configured to be selectively switched between a plurality of states having different optical powers. The broadband adaptive lens assembly are be configured to alter a polarization state of the outcoupled light passing therethrough when activated (e.g., electrically activated).

As used herein, an adaptive lens assembly refers to a lens assembly having at least one optical property that may be adjusted, e.g., reversibly activated and deactivated, using an external stimulus. Example optical properties that may be reversibly activated and deactivated include, among other properties, optical power (focal length), phase, polarization, polarization-selectivity, transmissivity, reflectivity, birefringence and diffraction properties, among other properties. In various embodiments, adaptive lens assemblies are capable of electrically varying the optical power and the polarization state of light passing therethrough.

In the illustrated embodiment, each of the pair of broadband adaptive lens assemblies 1004, 1008 is configured to be selectively switched between at least two states, where, in a first state each is configured to pass the outcoupled light therethrough without altering a polarization state thereof, while in a second state each is configured to alter the polarization state of the outcoupled light passing therethrough. For example, in the second state, each of the broadband adaptive lens assemblies 1004, 1008 reverses the handedness of circularly polarized light, while in the first state, each of the broadband adaptive lens assemblies 1004, 1008 preserves the handedness of circularly polarized light.

Still referring to FIG. 10, the display device 1000 further comprises a waveguide assembly 1012 interposed between the pair of adaptive lens assemblies 1004, 1008. The waveguide assembly 1012 may be similar to the waveguide assembly 260 described above with respect to FIG. 6, which comprises one or more waveguides, similar to one or more waveguides 270, 280, 290, 300, 310 in FIG. 6. As described supra, e.g., with respect to FIGS. 6 and 7, the waveguide may be configured to propagate light under total internal reflection in a lateral direction parallel to a major surface of the waveguide. The waveguide may further be configured to outcouple the light, e.g., in a direction normal to the major surface of the waveguide.

Still referring to FIG. 10, a first adaptive lens assembly 1004 of the pair of adaptive lens assemblies is disposed on a first side of the waveguide assembly 1012, e.g., the side of the world 510 observed by a user, and a second adaptive lens assembly 1008 of the pair of lens assemblies is disposed on a second side of the waveguide assembly 1012, e.g., the side of the eye 210 of the user. As described infra, the pair of adaptive lens assemblies as configured provides to a user virtual content from the waveguide assembly 1012 at a plurality of virtual depth planes, as well the view of the real world. In some embodiments, there is little or no distortion due to the presence of the adaptive lens assemblies. The virtual content and the view of the real world are provided to the user upon activation of the first and second adaptive lens assemblies 1004, 1008, as described infra with respect to FIGS. 11A and 11B.

Figures 11A, 11B:
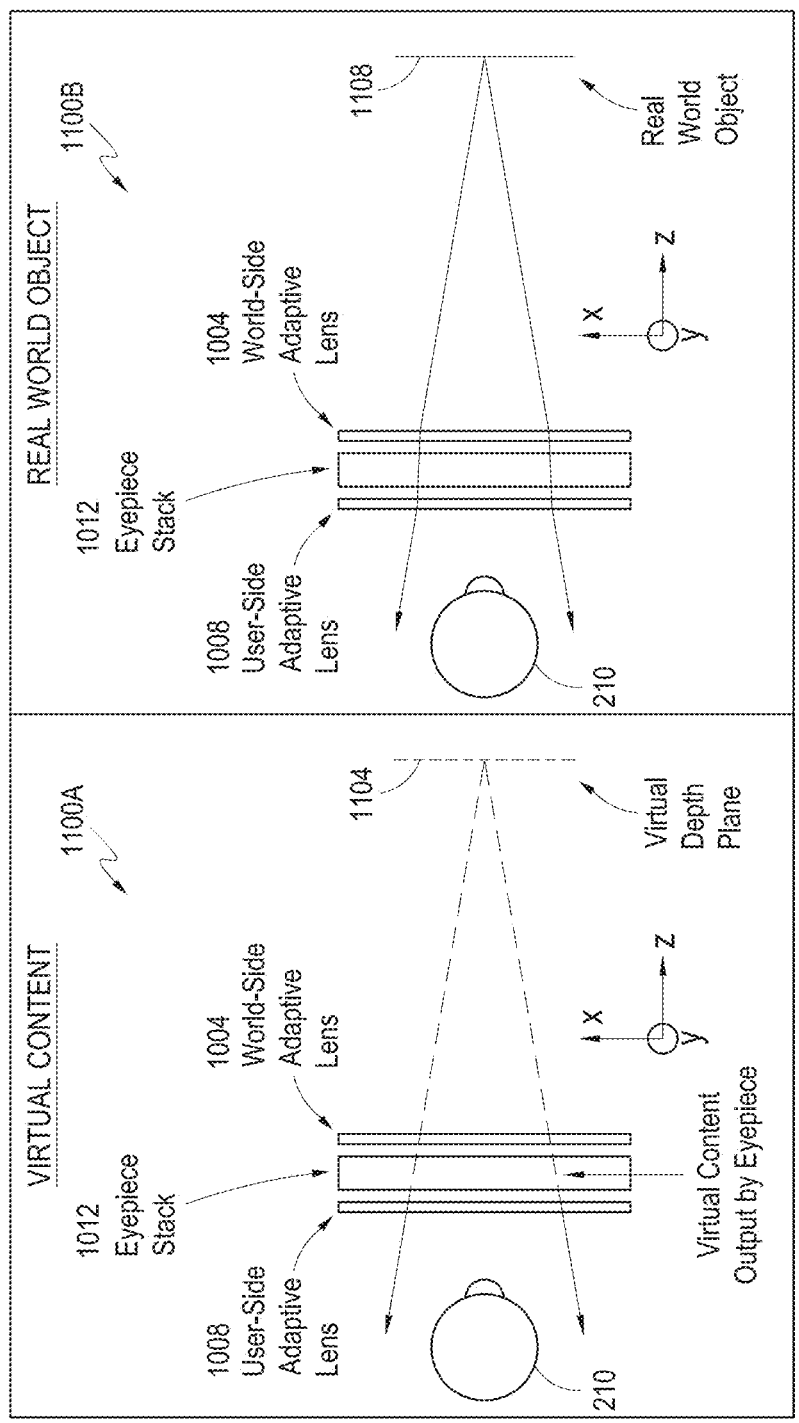
FIG. 11A illustrates an example of the display system of FIG. 10 displaying virtual content to a user at a virtual depth plane.
FIG. 11B illustrates an example of the display system of FIG. 10 providing a view of real world content to a user.

FIGS. 11A and 11B illustrate examples of display devices 1100A/1100B, each comprising adaptive lens assemblies in operation to output image information to a user. The display devices 1100A and 1100B in unpowered state are structurally identical. The display device 1100A is used herein to describe outputting virtual image to the user, while the display device 1100B is used herein to describe transmitting a real world image through the display device 1100B to the user. The display device 1100A/1100B includes a pair of the switchable lenses assemblies 1004, 1008 that are configured to be electrically activated by, e.g., application of a voltage or a current. In some embodiments, in a deactivated state, e.g., when no voltage or current is applied, each of the first and second switchable lenses assemblies 1004, 1008 has a low, e.g., about zero, optical power. In some embodiments, in an activated state, e.g., when a voltage or a current is applied, the first adaptive lens assembly 1004 on the side of the world may provide a first net optical power (Pnet1) having a first sign, e.g., a positive optical power. When in an activated state, the second adaptive lens assembly 1008 on the side of the user may provide a second net optical power (Pnet2) having a second sign, e.g., a negative optical power.

FIG. 11A illustrates an example of the display system of FIG. 10 displaying virtual content to a user at a virtual depth plane, according to some embodiments. As described supra, the waveguide assembly 1012 interposed between the pair of the adaptive lens assemblies 1004, 1008 comprises a waveguide configured to receive light containing virtual image information and propagate the light under total internal reflection. The waveguide assembly 1012 is further configured to outcouple the light through, e.g., a diffraction grating, towards the eye 210. The outcoupled light passes through the second adaptive lens assembly 1008 prior to entering the eye 210. When activated, the second adaptive lens assembly 1008 has a second net optical power, Pnet2, which may have a negative value, such that the user sees the virtual image at a virtual depth plane 1104.

In some embodiments, the second net optical power Pnet2 may be adjusted electrically to adjust the second net optical power (Pnet2) of the second adaptive lens assembly 1008, thereby adjusting the distance to the virtual depth plane 1104. For example, as a virtual object "moves" closer and further relative to the eye 210 within a virtual three dimensional space, the second net optical power Pnet2 of the second adaptive lens assembly 1008 may be correspondingly adjusted, such that the virtual depth plane one 1104 adjusts to track the virtual object. Thus, the user may experience relatively little or no accommodation/vergence mismatch beyond an acceptable threshold. In some embodiments, the magnitude of the distance to the virtual depth plane 1104 may be adjusted in discrete steps, while in some other embodiments, the magnitude of the distance to the virtual depth plane 1104 may be adjusted continuously.

FIG. 11B illustrates an example of the display system of FIG. 10 providing a view of real world content to a user, according to some embodiments. When the second adaptive lens assembly 1008 is activated to have the second net optical power (Pnet2) to display the virtual content at the virtual depth plane 1104, light from the real world passing through the second adaptive lens assembly 1008 may also be converged or diverged according to Pnet2 of the activated second adaptive lens assembly 1008. Thus, objects in the real world may appear out of focus. To mitigate such distortion, according to embodiments, when activated, the first and second adaptive lens assemblies 1004, 1008 may be configured to have optical powers having opposite signs. In some embodiments, light passing through the first and second adaptive lens assemblies 1004, 1008 converges or diverges according to a combined optical power having a magnitude that is about a difference between magnitudes of first and second net optical powers Pnet1, Pnet2, of the first and second adaptive lens assemblies 1004, 1008, respectively. In some embodiments, the waveguide assembly 1012 may also have optical power and the adaptive lens assembly 1008 may be configured to account for the distortions caused by both the lens assembly 1004 and the waveguide assembly 1012. For example, the optical power of the adaptive lens assembly 1008 may be opposite in sign to the sum of the optical powers of the lens assembly 1004 and the waveguide assembly 1012.

In some embodiments, the first adaptive lens assembly 1004 is configured to have the first net optical power Pnet1 that has a magnitude that is close to or the same as the magnitude of the second net optical power Pnet2 of the second adaptive lens assembly 1008. As a result, when both the first and second adaptive lens assemblies 1004, 1008 are activated simultaneously, objects in the real world appear relatively unaffected by the optical power of the second adaptive lens assembly 1008 provided for displaying the virtual content.

In some embodiments, first adaptive lens assembly 1004 may be configured such that when activated, the first net optical power Pnet1 dynamically matches the second net optical power Pnet2 of the second adaptive lens assembly 1008. For example, as the second net optical power Pnet1 of the second switchable assembly 1008 is adjusted to track moving virtual objects within the virtual three dimensional space, the first net optical power Pnet1 of the first adaptive lens assembly 1004 may be dynamically adjusted, such that the magnitude of the combined optical power P=Pnet1+Pnet2 may be kept less than a predetermined value. Thus, according to embodiments, the objects in the real world may be prevented from being unacceptably out of focus by compensating the second net optical power (Pnet2) of the second adaptive lens assembly 1008, which may have a negative value, with the first net optical power (Pnet1) of the first adaptive lens assembly 1004, such that the combined optical power P=Pnet1+Pnet2 remains small, e.g., near about 0 $m^{-1}$.

Switchable Waveplate and Switchable Waveplate Lenses for Broadband Adaptive Waveplate Lens Assemblies As discussed above, one of the advantages of forming images at a plurality of depth planes with fewer waveguides is the overall reduction in thickness and weight of the display device (e.g., display device 1000 in FIG. 10). Thus, various embodiments described herein provide adaptive waveplate lens assemblies that are compact, lightweight and provide various optical functionalities, e.g., high bandwidth capability and variable optical power. In addition, various embodiments described herein provide adaptive lens assemblies with relatively low amount of leakage light.

To provide images at a plurality of depth planes with high efficiency over a wide range of the visible spectrum, the broadband adaptive lens assembly according to various embodiments include a waveplate lens (1154A, 1154B in FIGS. 12A, 12B, respectively) comprising liquid crystals arranged such that the waveplate lens has birefringence ($\Delta n$) that varies in a radial direction from a central region of the first waveplate lens and that decreases with increasing wavelength ($\lambda$) within a range of the visible spectrum. As described above, according to various embodiments, the broadband adaptive waveplate lens assembly can generate images at multiple depth planes by being configured to be selectively switched between a plurality of states with different optical powers. The selective switching of the broadband lens assembly can in turn be performed by switching a waveplate lens or a waveplate included in the broadband adaptive waveplate lens assembly according to embodiments, as discussed herein.

Referring to FIG. 12A, in some embodiments, the broadband adaptive lens assembly 1150A is configured to be switched between different optical power states by employing a switchable waveplate 1158 comprising liquid crystals in the same optical path as the waveplate lens 1154A. The waveplate lens 1154A may be a passive lens and the broadband adaptive lens assembly 1150A may be selectively switched between different states by electrically activating and deactivating the switchable waveplate 1158.

Still referring to FIG. 12A, in operation, the waveplate lens 1154A is configured such that it diverges or converges incident light 1162A, 1162B passing therethrough depending on the polarization of the light, e.g., circular polarization, according to various embodiments. When configured as a half-waveplate (HWP) lens, the illustrated waveplate lens 1154A, which may be a passive waveplate lens, is configured to converge a right-hand circular polarized (RHCP) light beam 1162B incident on the waveplate lens 1154A into a left-hand circular polarized (LHCP) beam 1166A. On the other hand, the waveplate lens 1154A is configured to diverge a LHCP light beam 1162A incident on the waveplate lens 1154A into a right-hand circular polarized (RHCP) beam 1166B.

Still referring to FIG. 12A, after being focused or defocused by the waveplate lens 1154A depending on the circular polarization of the light incident thereon, the LHCP light beam 1166A or the RHCP light beam 1166B is incident on a switchable waveplate 1158. The liquid crystals of the switchable waveplate 1158 are configured such that, when activated, e.g., electrically activated, the polarization of a circularly polarized light passing therethrough is preserved (not illustrated). That is, the LHCP light beam 1166A and the RHCP light beam 1166B passes through the switchable waveplate 1158 unaffected. On the other hand, when deactivated, e.g., electrically activated, the polarization of the circularly polarized light passing therethrough is flipped (illustrated). That is, the LHCP light beam 1166A is converted to a RHCP light beam 1170A and the RHCP light beam 1166B is converted to a LHCP light beam 1170B.

Referring to FIG. 12B, in some other embodiments, the broadband adaptive lens assembly 1150B is configured to be switched between different optical power states by employing a switchable waveplate lens 1154B comprising liquid crystals. The adaptive lens assembly 1150B may be selectively switched between different states by electrically activating and deactivating the switchable waveplate lens 1154B.

In operation, the liquid crystals of the waveplate lens 1154B are configured such that the waveplate lens 1154B diverges or converges the incident light 1162A, 1162B passing therethrough depending on its polarization, e.g., circular polarization, according to various embodiments. When configured as a half-waveplate lens, when deactivated, e.g., electrically deactivated, the illustrated waveplate lens 1154B is configured to converge a RHCP light beam 1162B incident on the waveplate lens 1160B into a LHCP beam 1166A. Conversely, when deactivated, the waveplate lens 1154B is configured to diverge a left-hand polarized (LHCP) light beam 1162A incident on the waveplate lens 1154B into a RHCP beam 1166B. On the other hand, when activated, e.g., electrically deactivated, the polarization of the circularly polarized light passing therethrough is preserved (not illustrated), and the LHCP light beam 1162A and the RHCP light beam 1162B incident thereon pass through the waveplate lens 1154B without substantially being converged or diverged. In various embodiments, by configuring the liquid crystals to be rearranged in response to a switching signal, e.g., electric field, the waveplate lens assemblies 1150A, 1150B may be activated or deactivated to converge or diverge and to flip or conserve the polarization of circularly polarized light depending on its polarization.

Broadband Switchable Waveplates

As described above, according to various embodiments, the broadband adaptive waveplate lens assembly can be used to generate images at multiple depth planes by selectively switching the broadband waveplate lens assembly between a plurality of lens states having different optical powers. As described above, in some embodiments, the broadband adaptive waveplate lens assembly may be configured to be selectively switched between a plurality of lens states by electrically activating a broadband switchable waveplate included in the broadband adaptive waveplate lens assembly. In the following, embodiments of broadband switchable waveplates are disclosed.

In some embodiments, a broadband switchable waveplate comprises a layer of unpolymerized twisted nematic (TN) liquid crystals (LCs) and is configured to be switched upon application of an electric field across a thickness of the layer of TN LCs. Without being bound to any theory, the switching may be achieved upon altering orientations of the unpolymerized LC molecules across the thickness of the layer of TN LCs.

Figure 13A:
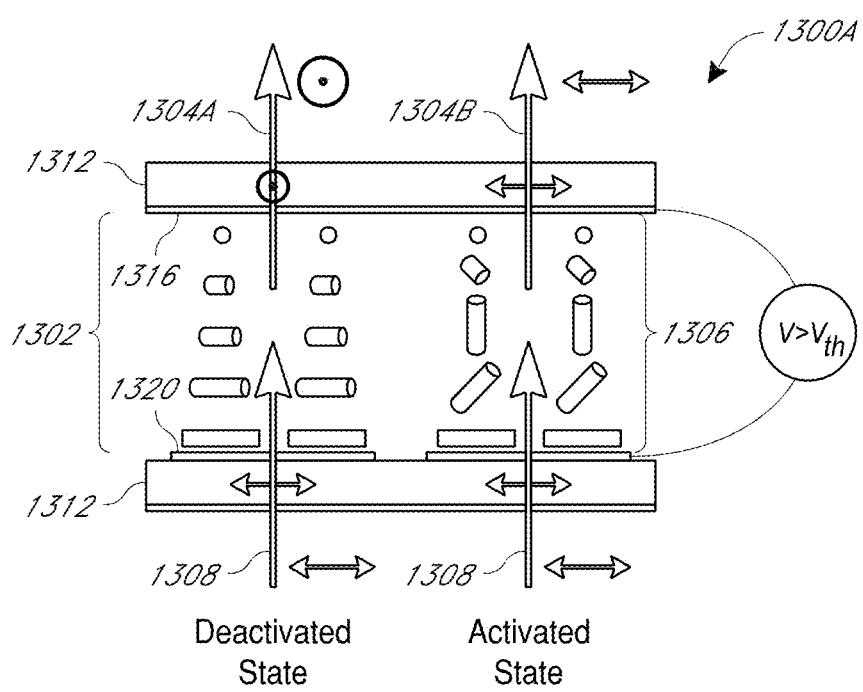
FIG. 13A illustrates a cross-sectional view of an example of a switchable waveplate comprising a layer of twisted nematic liquid crystals.

Referring to FIGS. 13A-13F, according to various embodiments, broadband switchable waveplates comprise a layer of twisted nematic (TN) liquid crystals (LCs). FIG. 13A illustrates a cross-sectional view of an example of a switchable waveplate comprising a layer of TN LCs. A TN LC switchable waveplate 1300A comprises a layer 1302 of TN LCs disposed between a pair of transparent substrates 1312. Each of the transparent substrates 1312 has formed on the inner surface a conducting transparent electrode 1316, 1320.

The surfaces of the transparent electrodes 1316, 1320 and/or the substrates 1312 may be configured such that the TN LC molecules in contact with or immediately adjacent to the upper electrode 1316 tend to orient with their long axes extending in a first lateral direction, while the TN LC molecules in contact with or immediately adjacent to the lower electrode 1320 tend to orient with their long axes extending in a second lateral direction, which may cross, e.g., to form an angle of about 90 degrees relative to, the first lateral direction. The TN LC molecules between the TN LC molecules immediately adjacent to the lower electrode 1320 and the TN LC molecules immediately adjacent to the upper electrodes 1316 undergo a twist. As configured, the TN LC switchable waveplate 1300A is configured as a broadband waveplate.

Still referring to FIG. 13A, in operation, in the absence of an electric field (deactivated state) across the TN LC layer 1302, the nematic director of the TN LC molecules undergoes a smooth 90 degree twist across the thickness of the TN LC layer 1302. In this state, the incident light 1308 polarized in a first direction (same direction as the LC molecules closest to the lower electrodes 1312) is incident on the TN LC layer 1302. The twisted arrangement of the TN LC molecules within the TN LC layer 1302 then acts as an optical wave guide and rotates the plane of polarization by a quarter turn (90 degrees) prior to reaching the upper electrodes 1316. In this state, the TN LC layer 1302 serves to shift the polarization direction of linearly polarized light passing therethrough from one linear polarization direction to another. Thus, the transmitted light 1304 is polarized in a second direction (same direction as the LC molecules close to the upper electrodes 1316) opposite the first direction.

On the other hand, when a voltage exceeding a threshold voltage (V>Vth) of the TN LC switchable waveplate 1300A is applied to across the electrodes 1316, 1320 (activated state), the TN LC molecules within the TN LC layer 1306 tend to align with the resulting electric field and the optical wave guiding property of the TN LC layer 1304 described above with respect to the deactivated state is lost. In this state, the TN LC layer 1306 serves to preserve the polarization direction of light passing therethrough. Thus, the incident light 1308 and the transmitted light 1304B are polarized in the same first direction (same direction as the LC molecules closest to the lower electrodes 1312).

When the electric field is turned off, the TN LC molecules relax back to their twisted state and the TN LC molecules of the TN LC layer 1306 in the activated state return to the configuration of TN LC molecules of the TN LC layer 1302 in the deactivated state.

As described above, the TN LC switchable waveplate 1300A described with respect to FIG. 13A serves to shift the polarization direction of linearly polarized light. However, various broadband waveplate lens assemblies described herein include a switchable waveplate configured as a switchable half waveplate for reversing handedness of circular polarized light. Thus, in the following with respect to FIGS. 13B-13D, switchable waveplates configured as switchable half waveplates are described, according to embodiments.

Figure 13B:
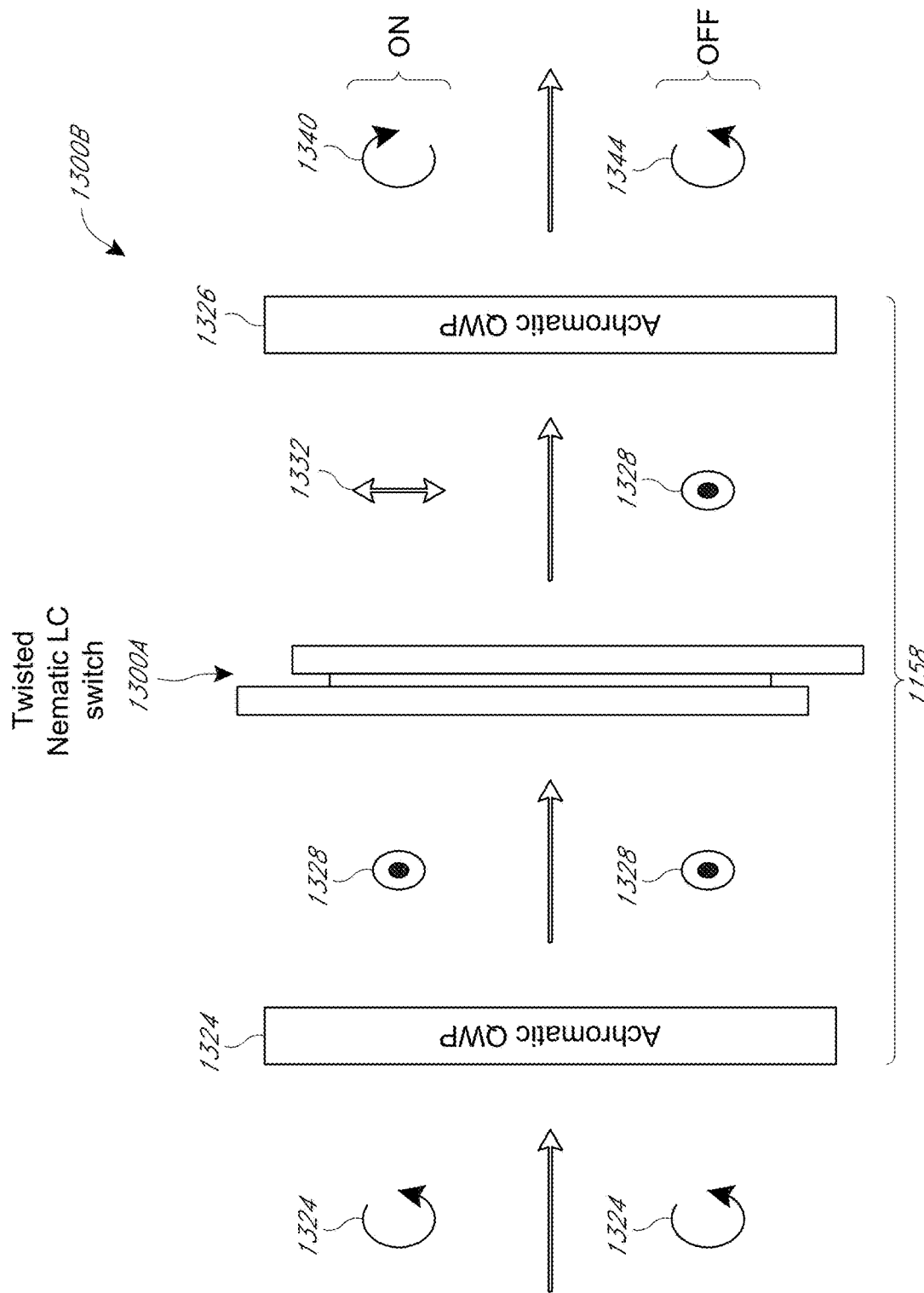
FIG. 13B illustrates an example of a switchable waveplate assembly comprising the switchable waveplate of FIG. 13A interposed between a pair of quarter waveplates in operation with the switchable waveplate activated or deactivated.

FIG. 13B illustrates a cross-sectional view of a switchable broadband waveplate 1300B configured as a half wave plate, according to embodiments. The switchable broadband waveplate 1300B includes the TN LC switchable waveplate 1300A illustrated with respect to FIG. 13A. In addition, in order to serve as a broadband half waveplate for circular polarized light, the switchable broadband waveplate 1300B additionally includes a pair of achromatic quarter waveplates (QWP) 1324, 1326.

In operation, in an activated state of the switchable broadband waveplate 1300B, when an incident circularly polarized light beam 1324 having a first handedness, e.g., a left-hand circular polarized (LHCP) light beam, passes through the first QWP 1324, the first QWP 1324 converts the circularly polarized light beam 1324 into a first linearly polarized light beam 1328 having a first linear polarization. Subsequently, upon passing through an activated TN LC switchable waveplate 1300A, the first linearly polarized light beam 1328 is converted into a second linearly polarized light beam 1332 having a second linear polarization. Subsequently, upon passing through the second QWP 1326, the second linearly polarized light beam 1332 is transformed into an exiting circularly polarized light beam 1340 having a second handedness opposite the first handedness, e.g., into a RHCP light beam. Thus, when activated, the switchable broadband waveplate 1300B serves as a half waveplate that reverses the polarization of a circular polarized light beam.

On the other hand, when the switchable broadband waveplate 1300B is deactivated, after the incident circularly polarized light beam 1324 passes through the first QWP 1324 as described above and subsequently passes through a deactivated TN LC switchable waveplate 1300A, the polarization of the first linearly polarized light beam 1328 is preserved. Thereafter, upon passing through the second QWP 1326, first linearly polarized light beam 1328 is transformed into an exiting circularly polarized light beam 1340 having the first handedness, e.g., into a LHCP light beam. Thus, when deactivated, the broadband waveplate 1300B serves as transparent medium which preserves the polarization of a circular polarized light beam.

In various embodiments described herein, the first and/or second QWP 1324, 1326 are broadband quarter waveplates having similar bandwidths compared to the TN LC switchable waveplate 1300A. According to embodiments, quarter waveplates can be formed using a polymerized TN LC layer. To provide broadband capability, QWP according to various embodiments include a plurality of TN LC layers. When each of the TN LC layers are formed on its own substrate, the resulting broadband quarter waveplate and/or the optical absorption of the resulting stack may become unacceptably thick. Thus, in the following, embodiments of QWPs comprising a plurality of TN LC layers formed on a single substrate are described, for efficient integration with the TN LC switchable waveplate 1300A.

Figure 13C:
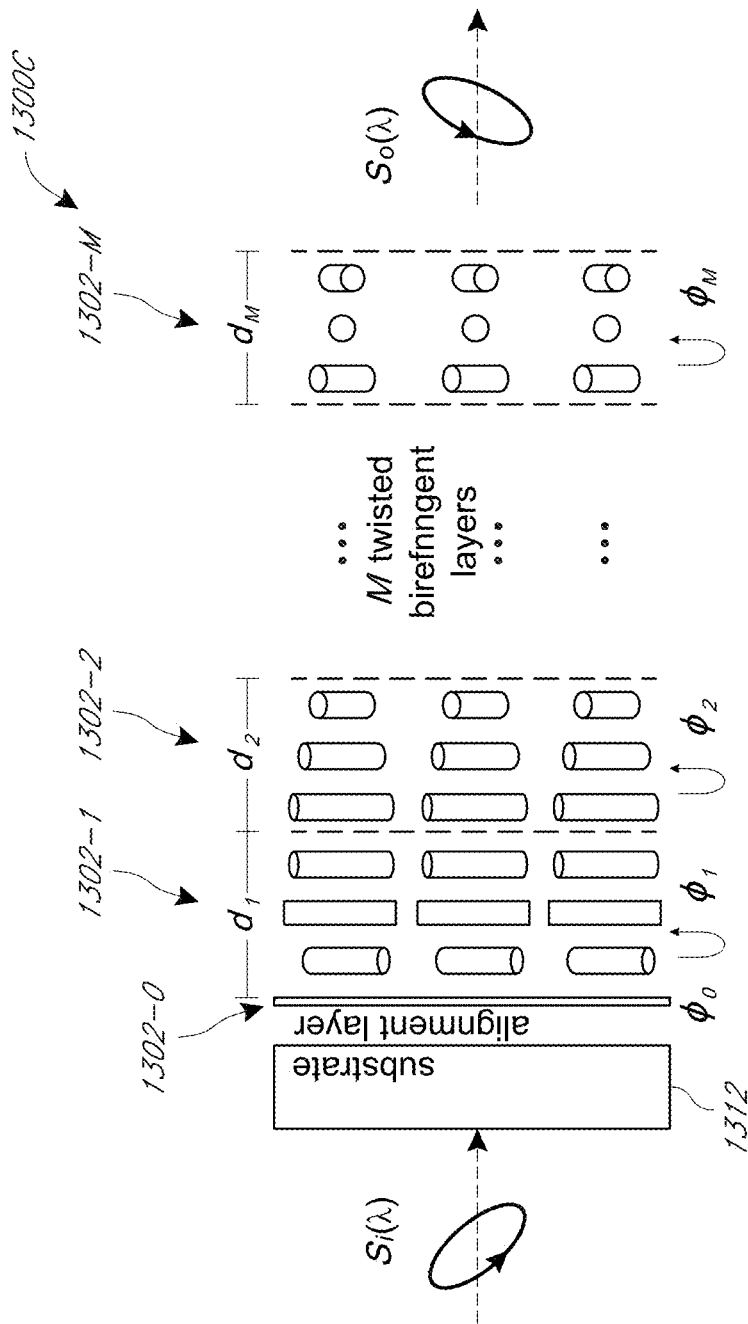
FIG. 13C illustrates an example of the quarter waveplate comprising a plurality of layers of twisted nematic liquid crystal layers.

FIG. 13C illustrates a cross-sectional view of a broadband QWP 1300C, which can be the first and/or second QWP 1324, 1326 illustrated above with respect to FIG. 13B, comprising a plurality (M) of TN LC layers 1302-1, 1302-2, ... 1302-M, stacked on an alignment layer 1302-0 formed on a substrate 1312. The alignment layer 1302-0, which is described in more detail elsewhere in the specification, is configured to induce the elongation direction of the LC molecules in the first TN LC layer 1302-1 that are immediately adjacent to the alignment layer 1302-0 to be aligned in a first direction. The LC molecules above the LC molecules aligned by the alignment layer 1302-0 undergo a first twist, such that the LC molecules in the first TN LC layer 1302-1 directly adjacent to the second TN LC layer 1302-2 are elongated in a second direction. The alignment of LC molecules in each of the subsequent TN LC layers 1302-2 to 1302-M are aligned in a similar manner as the first TN LC layer 1302-1 except, the LC molecules closest to the previous layer is aligned in the same direction as the topmost LC molecules of the previous layer. For example, the topmost LC molecules in the first TN LC layer 1302-1 and the bottommost LC molecules in the second TN LC layer 1302-1 are aligned in the same second direction. The LC molecules in the second TN LC layer 1302-2 undergo a second twist, such that the topmost LC molecules in the second TN LC layer 1302-2 are elongated in a third direction. Such alignment of LC molecules in a given TN LC layer as a result of the alignment of LC molecules in an adjacent layer in contact therewith is sometimes referred to as self-alignment, because no intervening alignment layer is interposed therebetween. Thus, in some embodiments, embodiments broadband QWPs comprise a plurality of TN LC layers having two or more self-aligned TN LC layers each having a non-zero twist.

In embodiments, the TN LC layers comprise polymerized LC molecules (LCPs), formed using, e.g., reactive mesogens. As described above, reactive mesogens are initially low molecular weight LCs which may be aligned by surfaces and a twist to have complex profiles, as with conventional LCs, but which may then be cured into a solid polymer film by photo-polymerization.

Figure 13E:
FIG. 13E illustrates an example of a switchable waveplate assembly comprising a layer of twisted nematic liquid crystals interposed between a pair of quarter waveplates integrated as a single stack.
Figure 13D:
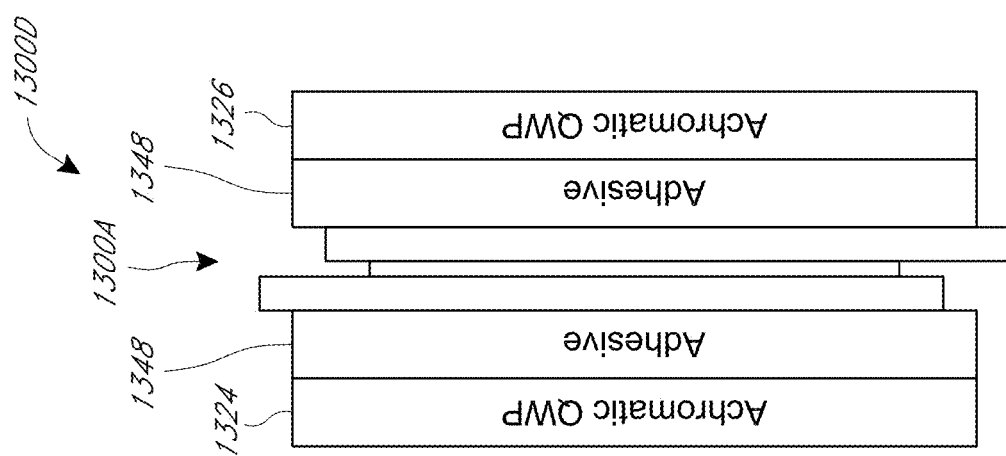
FIG. 13D illustrates an example of a switchable waveplate assembly comprising the switchable waveplate of FIG. 13A interposed between a pair of quarter waveplates integrated as a single stack using adhesive layers.

FIG. 13D illustrates a cross-sectional view of an integrated switchable broadband waveplate 1300D in which a TN LC switchable waveplate 1300A similar to that described above with respect to FIG. 13A is integrated into a single stack with a pair of broadband QWP 1324, 1326 similar to that described above with respect to FIG. 13C. In the illustrated embodiment, the TN LC switchable waveplate 1300A is integrated into a single stack by having attached on opposing sides thereof the pair of broadband quarter waveplates 1324, 1326 using adhesive layers 1348.

FIG. 13E illustrates a cross-sectional view of an integrated switchable broadband waveplate 1300E in which a TN LC switchable waveplate 1300A similar to that described above with respect to FIG. 13A is integrated into a single stack with a pair of broadband quarter waveplates 1324, 1326 in a similar manner as described above with respect to FIG. 13D, except, instead of using adhesive to form an integrated stack, one of the pair of broadband quarter waveplates 1324, 1326 serves as a substrate on which a TN LC switchable waveplate 1300A (FIG. 13A) may be directly formed. For example, on a surface of one of the QWP 1324, 1326, different layers of the TN LC switchable waveplate 1300A may be directly formed. Advantageously, one or both of the substrates 1312 of the TN LC switchable waveplate 1300A may be omitted. Thus, the TN LC switchable waveplate 1300A is integrated into a compact single stack by being directly formed on one of the pair of broadband QWP 1324, 1326, and forming thereon the other one of the pair of broadband QWP 1324, 1326.

In each of the embodiments illustrated above with respect to FIGS. 13D and 13E, the broadband QWP can be formed of liquid crystal-based materials or other non liquid crystal-based materials such as, e.g., quartz and MgF$_2$. In the following, with respect to FIG. 13F, an embodiment in which broadband QWP comprising liquid crystals is particularly advantageously integrated with a TN LC switchable waveplate into a single stack to serve not only as QWP but also as alignment layers for the TN LC switchable waveplate.

Figure 13F:
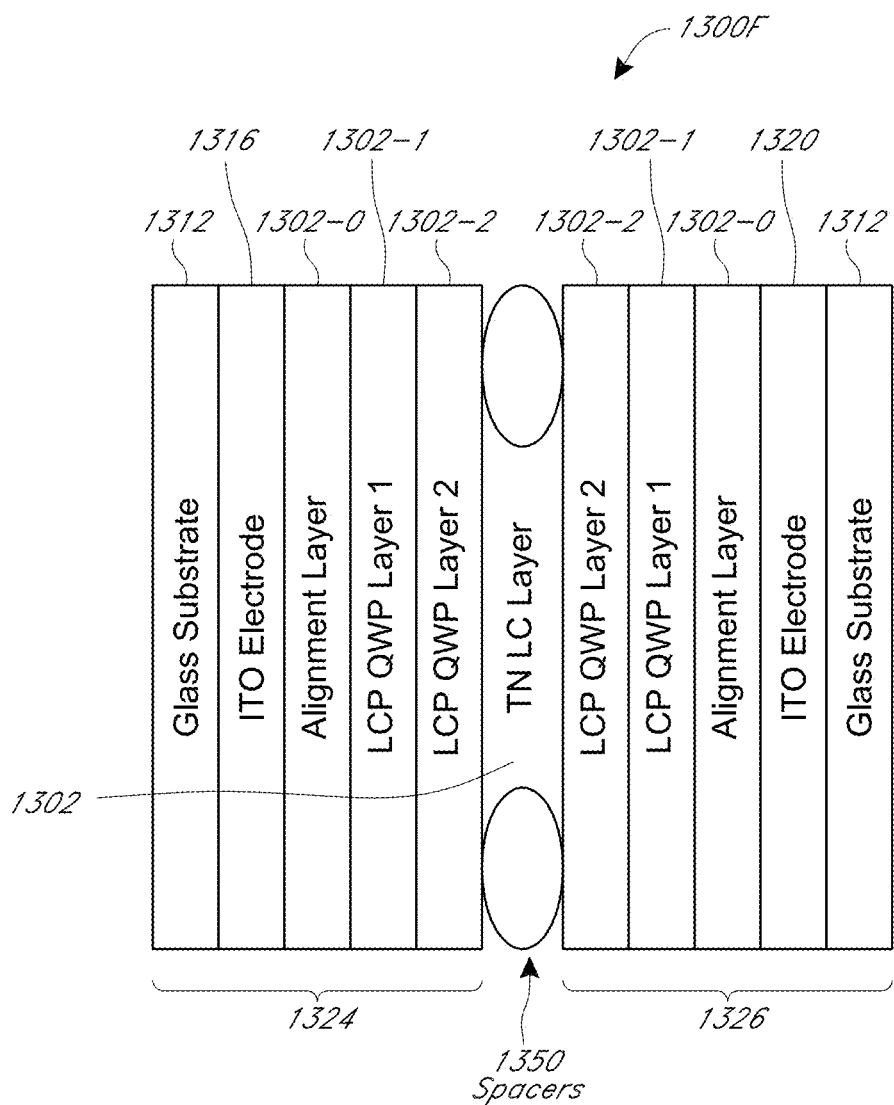
FIG. 13F illustrates an example of a switchable waveplate assembly comprising a layer of twisted nematic liquid crystals interposed between a pair of quarter waveplates of FIG. 13C integrated as a single stack.

FIG. 13F illustrates a cross-sectional view of an integrated switchable broadband waveplate 1300F integrating a TN LC switchable waveplate 1300A similar to that described above with respect to FIG. 13A. The switchable broadband waveplate 1300F includes a pair of broadband QWP 1324, 1326 arranged in a similar manner as described above with respect to FIG. 13E, except, instead of the broadband QWP 1324, 1326 as substrates for the TN LC layer 1302, broadband QWP 1324, 1326 comprising thin polymerized LC layers formed on respective surfaces of substrates 1312, and LC molecules of the TN LC layer 1302 are inserted into a gap formed between opposing surfaces of broadband QWP 1324, 1326 by spacers 1350, which defines the thickness of the TN LC layer 1302. The method of inserting the LC molecules is described elsewhere in the specification. In addition, different layers of the TN LC switchable waveplate 1300A and different layers of the broadband QWP 1324, 1326 are integrally formed into a single stack. For example, the first broadband QWP 1324 includes a substrate 1312 on which a lower transparent electrode 1316 is formed, followed by an alignment layer 1302-2 and a plurality of TN LC layers 1302-1, 1302-2. Similarly, the second broadband QWP 1326 includes a substrate 1312, on which an upper transparent electrode 1320 is formed, followed by an alignment layer 1302-0 and a plurality of TN LC layers 1302-1, 1302-2.

Still referring to FIG. 13F, advantageously, the outermost LC molecules of the TN LC layer 1302-2 of the first broadband QWP 1324 facing the gap and the outermost LC molecules of the TN LC layer 1302-2 of the second broadband QWP 1326 facing the gap are arranged to serve as alignment layers for the switchable TN LC layer 1302, such that the outermost LC molecules of the TN LC layer 1302 are self-aligned, in a similar manner as described above with respect to FIG. 13C. In addition, by integrally stacking different layers the TN LC switchable waveplate 1300A with different layers of the broadband QWP 1324, 1326, the total thickness of the entire stack can be substantially reduced. For instance, while mechanically bonding TN LC switchable waveplate 1300A as illustrated in FIG. 13A with the broadband quarter waveplates 1324, 1326 as illustrated in FIG. 13C would have resulted in as many as four substrates, the entire stack of the switchable broadband waveplate 1300F has only two substrates.

In references to FIG. 13F and various embodiments throughout the specification, a switchable LC layer, e.g., the TN LC layer 1302 inserted into the gap has a thickness of about 1 μm-50 μm, 1-10 μm, 10-20 μm, 20-30 μm, 30-40 μm, 40-50 μm or a value within any range defined by these values. In addition, passive LC layers, e.g., the TN LC layers 1302-1, 1302-2, can have a thickness of about 0.1 μm-50 μm, 0.1-1 μm, 1-10 μm, 10-20 μm, 20-30 μm, 30-40 μm, 40-50 μm or a value within any range defined by these values.

In various embodiments described herein, an alignment layer (e.g., 1302-2 in FIGS. 13C, 13F) is used to align LC molecules, e.g., align the elongation direction of LC molecules, along a particular direction. For example, as described above with respect to FIGS. 13A-13F, an alignment layer can be used to define a director (n), or a local average elongation direction of elongated LC molecules, in a predetermined direction. In some other embodiments, an alignment layer may be formed of organic polymers such as polyimides and polyamides that are mechanically rubbed, obliquely deposited inorganic oxides such as SiO$_2$, or long chain aliphatic siloxanes. In some embodiments, a noncontact alignment layer may be formed of organic polymers using plane-polarized light to generate a surface anisotropy, which turn defines the director. For example, use of cis-trans photoisomerization of azo dye, which may be deposited directly or dissolved into a standard orientation layer (e.g., polyimide) or the LC mixture, can produce an orientation effect in the alignment layer without rubbing. Noncontact alignment layers that use azo chromophores sometimes employ an intense laser light to induce the isomerization of the dye molecules.

In some other embodiments, a pattern of nanostructures can serve as an alignment layer for aligning the LC molecules. Advantageously, in some embodiments, the pattern of nanostructures can be formed as part of an electrode layer to improve optical transmittance, to reduce process steps, and to further reduce the overall thickness of the broadband waveplates described above, e.g., with respect to FIGS. 13A-13F. To achieve this end, FIG. 14A illustrates perspective view of a pattern of nanostructures 1400A, e.g., nanowires formed on a transparent substrate 1312, that serve a dual function of an alignment layer as well as an electrode layer, according to embodiments. The pattern of nanostructures 1400A can be patterned on the substrate 1312 using, e.g., a lithographic or a nanoimprinting technique, described in detail elsewhere in the specification. The nanostructures can be formed of a sufficiently thin conducting material that is patterned as elongated metal wires. For example, the conducting material can be gold, silver, copper, aluminum or ITO or any suitable conducting material having a thickness and electrical resistivity such that the resulting pattern of nanostructures can serve simultaneously as an alignment layer and as an electrode layer. In the illustrated embodiment, the pattern of nanostructures 1400A comprises periodic conducting lines 1404A extending in a first direction, e.g., x-direction, that are connected to a rail 1408A for supplying current or voltage to the periodic conducting lines 1404A. In various embodiments, the periodic conducting lines 1404A can have a pitch of 1 μm to 1000 μm, 5 μm to 500 μm, 10 μm to 100 μm, or any value within a range defined by these values. The conducting lines 1404 can have a width of 10 nm to 1 μm, 100 nm to 1000 nm, 100 nm to 500 nm, 200 nm to 300 nm, or any value within a range defined by these values. The periodic conducting lines 1404 can have a thickness of 10 nm to 1 μm, 100 nm to 1000 nm, 100 nm to 500 nm, 400 nm to 500 nm, or any value within a range defined by these values. A combination of the material, the thickness and the width of the periodic conducting lines 1404A can be selected such that a resulting sheet resistance of the periodic conducting lines 1404A is about 1 Ohms/square to 100 Ohms/square, 2 Ohms/square to 50 Ohms/square, 5 Ohms/square to 20 Ohms/square, or any value within a range defined by these values, for instance about 10 Ohms/square. In addition, a combination of the material and thickness of the conducting lines 1404A can be selected such that the resulting transmittance in the visible spectrum is 80% to 99%, 90% to 99%, 95% to 99%, 97% to 99%, or any value within a range defined by these values, for instance about 98%. Other dimensions, configurations and values are possible.

FIG. 14B illustrates a perspective view of a pattern of nanostructures 1400B that is similar to the pattern of nanostructures 1400A described above with respect to FIG. 14A, except, the pattern of nanostructures 1400B comprises periodic conducting lines 1404B extending in a second direction, e.g., y-direction, that are connected to a rail 1408B for supplying current to the periodic conducting lines 1404B.

FIG. 14C illustrates a perspective view of a pair of electrodes 1400C, according to embodiments. The pair of electrodes 1400C includes the pattern of nanostructures 1400A and the pattern of nanostructures 1400B arranged such that the periodic conducting lines 1404A and the periodic conducting lines 1404B face and cross each other, and are separated by a gap 1412 configured to dispose one or more LC layers, e.g., TN LC layers, therein. Advantageously, it has been found that each of the patterns of nanostructures 1400A and 1400B can serve as an alignment layer similar to the alignment layer 1302-0 described above with respect to FIGS. 13C, 13F such that when nematic LC molecules, e.g., reactive mesogens, are formed thereon, the LC molecules that are immediately adjacent to each of the patterns of nanostructures 1400A and 1400B may become aligned, e.g., with the director of the nematic LC molecules generally being aligned in the same direction as the elongation direction of the periodic conducting lines 1404A, 1404B. In addition, the LC molecules between the LC molecules immediately adjacent to the periodic conducting lines 1404A, 1404B can be configured to undergo a twist using a twisting agent such that an unpolymerized TN LC layers similar to the TN LC layer 1302 described above with respect to FIG. 13A and polymerized TN LC layer(s) similar to the TN LC layers 1302-1, 1302-2, . . . 1302-M described above with respect to FIG. 13C may be formed.

Referring back to FIG. 13F, it will be appreciated that, in some embodiments, by combining the functionality of an electrode and an alignment layer, the pattern of nanostructures 1400A can replace the combination of the transparent electrode 1316 and the alignment layer 1302-0 of the broadband QWP 1324, and the pattern of nanostructures 1400B can replace the combination of the transparent electrode 1320 and the alignment layer 1302-0 of the broadband QWP 1326, thereby allowing a more compact overall stack.

Still referring to FIG. 14C, in operation, the arrangement of LC molecules with and without an electric field and the corresponding effect on the polarization of light is similar to that described above with respect to FIG. 13A.

Figures 15A, 15B:
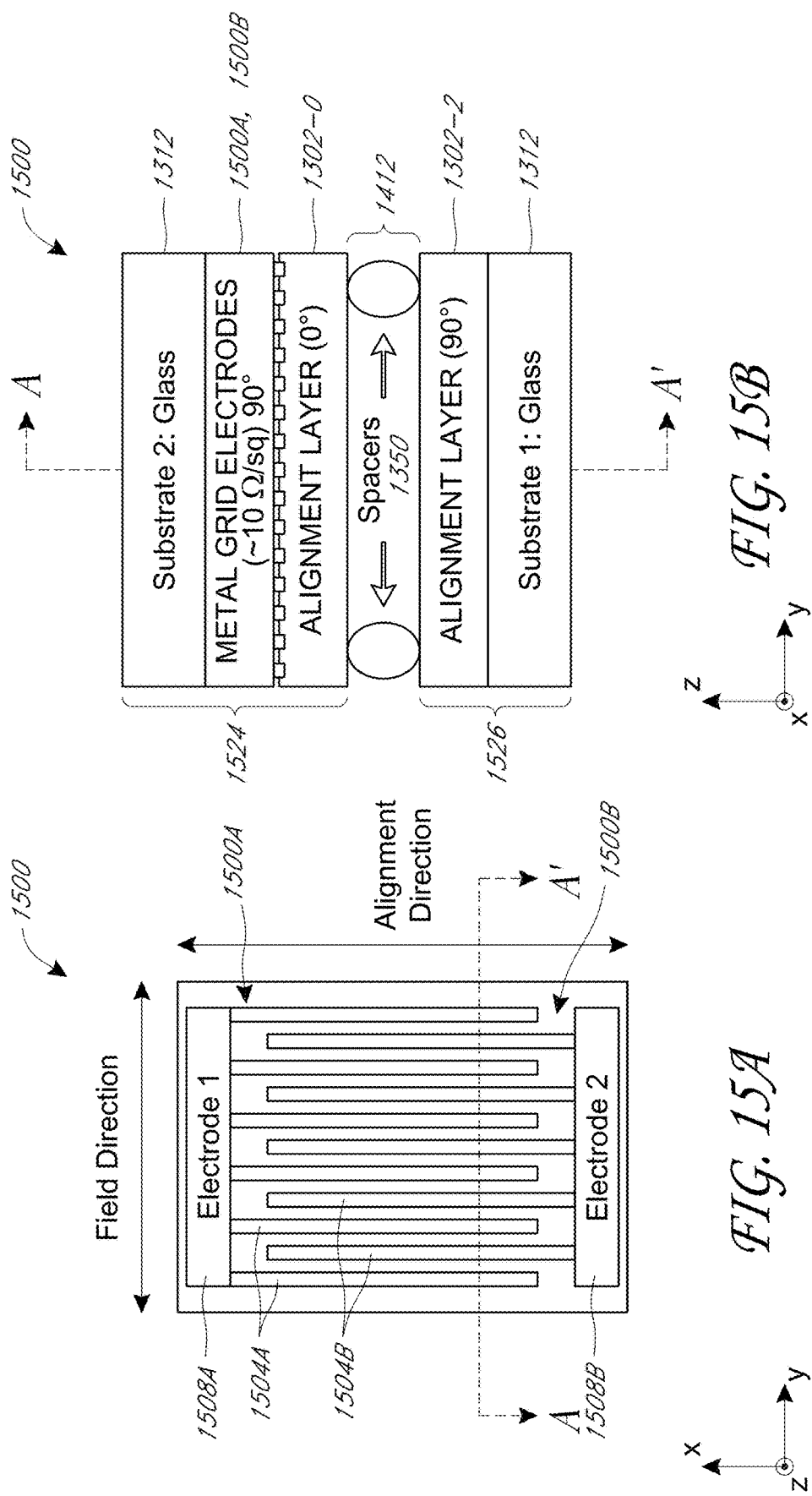
FIG. 15A illustrates a plan view of an example of a pair of horizontally interlaced transparent electrodes for switching a layer of liquid crystals.
FIG. 15B illustrates a cross-sectional view of an example of a switchable waveplate assembly including the pair of horizontally interlaced transparent electrodes of FIG. 15A.

FIGS. 15A and 15B illustrate a plan view and a cross-sectional view of a TN LC switchable broadband waveplate 1500, according to embodiments. Unlike the broadband waveplates illustrated above with respect to FIGS. 13A, 13F having vertically separated electrodes for switching, the TN LC switchable broadband waveplate includes an in-plane laterally separated electrodes for switching. The TN LC switchable broadband waveplate 1500 includes an alignment electrode stack 1524 and an alignment layer stack 1526. In a similar manner as described above with respect to FIG. 13F, LC molecules are inserted into a gap formed by spacers 1350 between opposing surfaces of the alignment electrode stack 1524 and the alignment layer stack 1526. The method of inserting the LC molecules is described elsewhere in the specification. The alignment electrode stack 1524 includes first and second electrodes 1500A, 1500B formed on an upper transparent substrate 1312, and further includes an optional upper alignment layer 1302-0. The alignment layer stack 1526 includes a lower alignment layer 1302-0 formed on a lower transparent substrate 1312.

Referring to FIG. 15A, the alignment electrode stack 1524 includes the first and second electrodes 1500A, 1500B each including a respective one of first and second periodic conducting lines 1504A, 1504B. The periodic conducting lines 1504A are interdigitated or interlaced and alternating with the periodic conducting lines 1504B. Each of the first and second periodic conducting lines 1504A, 1504B are strapped to rails 1508A, 1508B, respectively, in a similar manner as described above with respect to the patterned nanostructures 1400A (FIG. 14A), 1400B (FIG. 14B). The material, thicknesses, widths and the pitch of the alternating periodic conducting lines 1504A, 1504B can be similar to those described above with respect to the patterned nanostructures 1400A (FIG. 14A), 1400B (FIG. 14B). However, unlike the pair of electrodes 1400C described above with respect to FIG. 14C that are vertically separated, the periodic conducting lines 1504A are alternating with the periodic conducting lines 1504B in a lateral direction, e.g., x-direction, such that the electric field between the periodic conducting lines 1504A and the periodic conducting lines 1504B is directed in the lateral direction.

Referring to the cross-sectional view of the TN LC switchable cell 1500 in FIG. 15B, in a similar manner as described above with respect to FIG. 13F, LC molecules are inserted into the gap formed between opposing surfaces of the alignment electrode stack 1524 and the alignment layer stack 1526, such that a TN LC layer (not shown) similar to the TN LC layer 1302 (FIG. 13A) can be formed. The method of inserting the LC molecules is described elsewhere in the specification.

In some embodiments, in a similar manner as described above with respect to FIG. 14C, the alternating periodic conducting lines 1504A, 1504B and/or the upper alignment layer 1302-0 in the alignment electrode stack 1524 can serve as alignment layers for outermost LC molecules of a TN LC layer 1302 formed in the gap 1412, in a similar manner as the alignment layer 1316 described above with respect FIG. 13A and to the conducting lines 1404B described above with respect FIG. 14C. When the alternating periodic conducting lines 1504A, 1504B serve as an alignment layer, in some embodiments, the upper alignment layer 1302-0 may be omitted. In a similar manner to the alignment layer 1320 described above with respect FIG. 13A and to the conducting lines 1404A described above with respect FIG. 14C, the lower alignment layer 1302-0 may serve to align LC molecules in the gap 1412 that are immediately adjacent thereto.

While not illustrated, in some embodiments, the illustrated TN LC switchable broadband waveplate 1500 can integrate, in a similar manner as described above with respect to FIG. 1300F, a plurality of TN LC layers similar to the TN LC layers 1302-1, 1302-2, ... 1302-M (FIG. 13F, not shown) between the alternating periodic conducting lines 1504A, 1504B and the LC molecules in the gap 1412, and/or between the lower alignment layer 1302-0 and the LC molecules in the gap 1412, thereby providing an integrated QWP functionality in a similar manner as described above with respect to FIG. 13F.

Still referring to FIGS. 15A, 15B, in operation, in the absence of an electric field, the alternating periodic conducting lines 1504A, 1504B serve as an alignment layer for the LC molecules immediately adjacent to the periodic conducting lines 1504A, 1504B, such that the LC molecules have a director generally extending parallel to the periodic conducting lines 1504A, 1504B. In the deactivated state, in a similar manner as described above with respect to FIG. 13A, the switchable broadband waveplate 1500 is configured to flip the polarization of linearly polarized light. On the other hand, when an electric field is applied in a lateral direction, e.g., y-direction, between the periodic conducting lines 1504A and the periodic conducting lines 1504B, the LC molecules between immediately adjacent periodic conducting lines 1504A, 1504B align with their elongation direction in a direction away from parallel, e.g., between parallel and perpendicular or perpendicular, to the periodic conducting lines 1504A, 1504B. In the activated state, in a similar manner as described above with respect to FIG. 13A, the switchable broadband waveplate 1500 is configured to preserve the polarization of linearly polarized light.

In some embodiments, in addition to combining the functionality of electrodes and an alignment layer, the first and second electrodes 1500A, 1500B can, e.g., replace the combination of the transparent electrodes 1316, 1320 and the upper and lower alignment layers 1302-0 of the broadband waveplate 1300F (FIG. 13F), thereby allowing a further more compact overall stack, and even more improved transmittance due to halving of electrode layers.

Liquid Crystal-Based Waveplate Lenses

As described above with respect to FIG. 12A, to provide images at a plurality of depth planes with high efficiency over a wide range of the visible spectrum, some broadband adaptive waveplate lens assemblies according to embodiments include a switchable waveplate and one or more waveplate lenses, which may be passive or switchable, that are formed of a thin film of birefringent liquid crystals. In the following, example waveplate lenses comprising liquid crystals whose orientations in the plane of the waveplate are adapted for focusing and/or altering the polarization state of light transmitted therethrough are disclosed. In the following, various embodiments of lenses and waveplates are formed of liquid crystals.

Figure 16A:
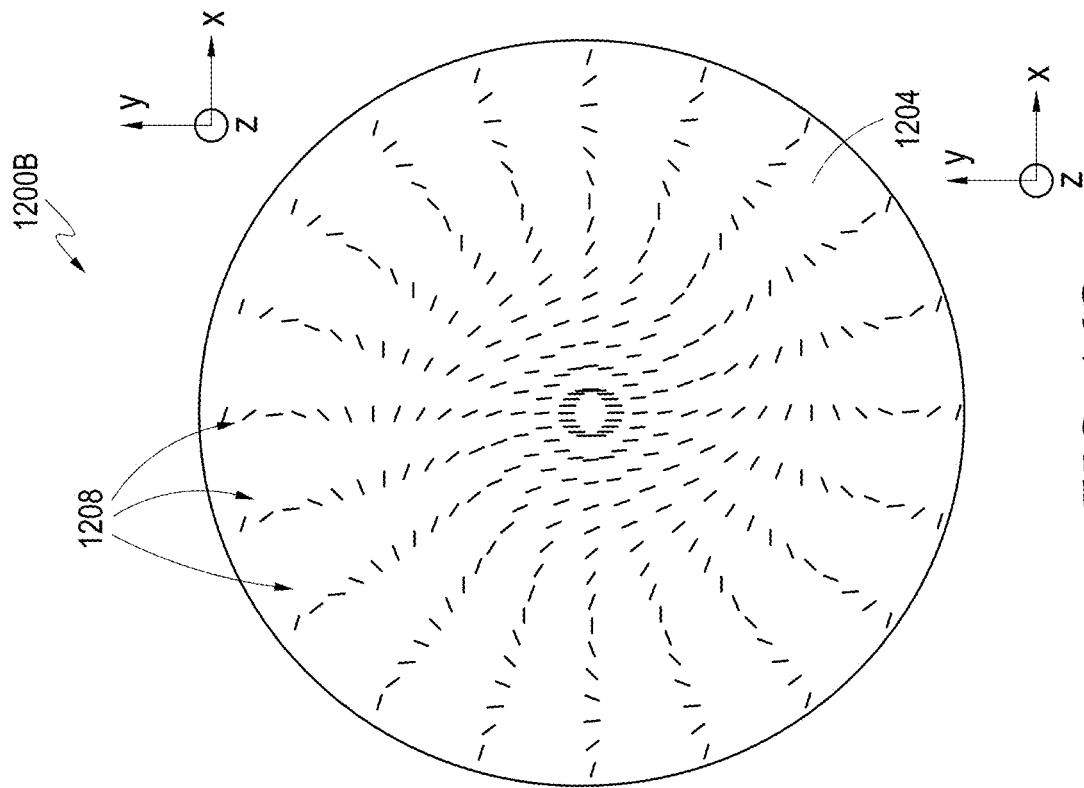
FIG. 16A illustrates a plan view of an example of a waveplate lens comprising liquid crystals.
Figure 16B:
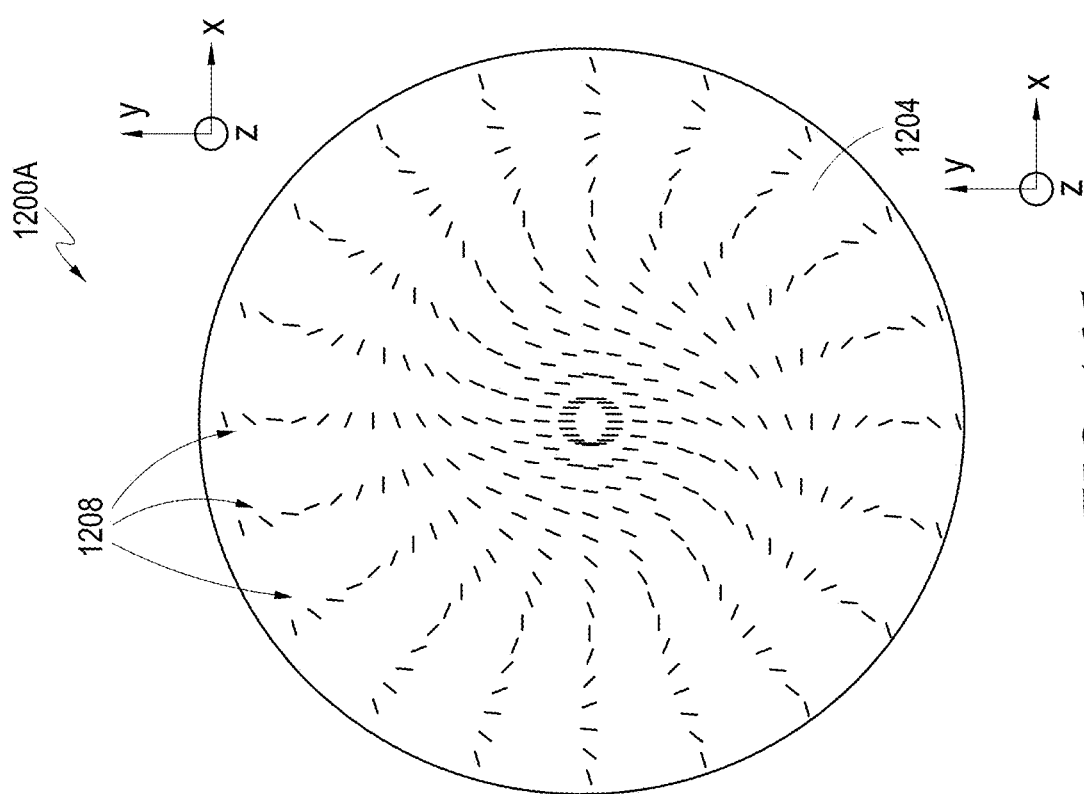
FIG. 16B illustrates a plan view of an example of a waveplate lens comprising liquid crystals.

One example of liquid crystal-based waveplate lenses is illustrated with respect to FIGS. 16A and 16B.

FIGS. 16A and 16B illustrate examples of waveplate lenses 1200A and 1200B, respectively, each comprising a transparent substrate 1204, e.g., a glass substrate, having formed thereon liquid crystal molecules 1208 elongated along different elongation directions relative to a direction parallel to an axial direction (e.g., x-direction or y-direction) along a major surface of the substrate 1204. That is, the liquid crystal molecules 1208 are rotated about a direction (e.g., z-direction) normal to a major surface of the substrate 1204 by different angles ($\varphi$) of rotation, where $\varphi$ is described as the angle between the direction of elongation of the liquid crystal molecules relative to a direction parallel to the layer normal (e.g., x-direction or y-direction).

In the illustrated implementations, the liquid crystal molecules 1208 at a given radius from a central axis C or the center of the lens have the same angle ($\varphi$) of rotation. As arranged, the liquid crystal molecules 1208 are configured to focus a collimated beam of light to a point at a focal length. Without being bound to any theory, the angle ($\varphi$) of rotation of liquid crystal molecules 1208 may be proportional to a power of r, where r is the radial distance from C and has a value between about 1 and 3, e.g., 2. In one implementation, the angle ($\varphi$) may be proportional to $+/-k_0 r^2/f$, where r is the radial distance from C and $k_0=2\pi/\lambda$ is the wavenumber of the light that is to be focused by the diffractive waveplate lens, $\lambda$ is the wavelength of the light, f is the focal length of the waveplate lenses 1200A, 1200B. The + and − sign can correspond to the direction of rotation of the liquid crystal molecules 1208 relative to the liquid crystal molecules 1208 nearest to the center C of the waveplate lenses 1200A, 1200B.

It will be appreciated that the patterns of liquid crystal molecules 1208 of waveplate lenses 1200A and 1200B represent flipped images of each other. That is, one of the waveplate lenses 1200A and 1200B may be obtained by rotating the other of the waveplate lenses 1200B and 1200B around an axial direction (e.g., x-direction or y-direction) by 180 degrees. As configured, focal lengths and optical powers of the waveplate lenses 1200A and 1200B are the same in magnitude but opposite in sign.

In some implementations, each of waveplate lenses 1200A and 1200B may serve as half waveplate lenses. When configured as a half-waveplate lens, each of the waveplate lenses 1200A and 1200B rotates the plane of a linearly polarized light by an angle $2\alpha$ with respect to the polarization of an input beam, where a is the angle between the input polarization direction and the waveplate axis. For a circular polarized beam, this change in angle translates into a phase shift and reversal of the polarization handedness. Thus, a $\pm 2\alpha$ phase shift may be generated in a circularly polarized beam with the sign of the phase shift depending on the polarization handedness.

FIG. 16C illustrates examples of a waveplate lens that diverges or converges light passing therethrough depending on the polarization of light and the side on which the light is incident, according to some embodiments. When configured as a half-waveplate lens, the illustrated waveplate lens 1200A may be configured to diverge a right-hand circular polarized (RHCP) light beam 1212 incident on a first side into a left-hand circular polarized (LHCP) beam 1216. On the other hand, the waveplate lens 1200A may be configured to converge a RHCP light beam 1220 incident on a second side opposite to the first side into a left-hand circular polarized (LHCP) beam 1224.

For the waveplate lens 1200B, the situation is reversed. As illustrated in FIG. 16D, when configured as a half-waveplate, the waveplate lens 1200B may be configured to converge a LHCP light beam 1228 incident on a first side into a RHCP beam 1232. On the other hand, the waveplate lens 1200B may be configured to diverge a LHCP light beam 1236 incident on a second side opposite the first side into a RHCP beam 1240.

Thus, by controlling the direction of angle of rotation and the radial distribution of the liquid crystals 1208, the waveplate lens may be configured to converge or diverge circularly polarized light having either handedness. It will be appreciated that, based on the relationship between the angles of rotation of the liquid crystals, the optical power may be increased or decreased. In addition, in some embodiments, the liquid crystals may be aligned and unaligned by applying an electric field. Thus, it will be appreciated that in the limit where the optical power is near zero, the waveplate lenses may be used as waveplates, e.g., switchable waveplates.

Broadband Adaptive Waveplate Lens Assemblies Including a Switchable Waveplate

As described above with respect to FIG. 12A, to provide images at a plurality of depth planes with high efficiency over a wide range of the visible spectrum, some broadband adaptive waveplate lens assemblies according to embodiments include a switchable waveplate and one or more waveplate lenses, which may be passive or switchable, that are formed of a thin film of birefringent material, e.g., liquid crystals. In the following, embodiments of broadband adaptive waveplate lens assemblies comprising a switchable broadband waveplate are disclosed. For example, the switchable broadband waveplate may be one of broadband switchable waveplates described above with respect to FIGS. 13A-13F, FIGS. 14A-14C and FIGS. 15A-15B.

Polarization Switches Configured to Provide Wide Field of View

A wide variety of examples of adaptive lens assemblies comprising waveplate lenses and switchable waveplates receiving light from a wide field-of-view are discussed above. As described above with reference to FIGS. 13A-13F, various implementations of such adaptive lens assemblies may include one or more layers of twisted nematic (TN) liquid crystal (LC) molecules. The efficiency of the optical wave guiding property of TN LC molecules, however, depends at least in part on the angle at which light is incident thereon. As such, increasing the angle of incidence of light on a TN LC layer (e.g., in a switchable waveplate) may cause a reduction in the ability to alter, e.g., rotate, the polarization state of the incident light. This characteristic may cause light directed from objects widely off-axis in the field of view to be effected differently than light propagating directly down an optical axis of the adaptive lens assembly normal to the switchable waveplate and waveplate lens.

Figure 17:
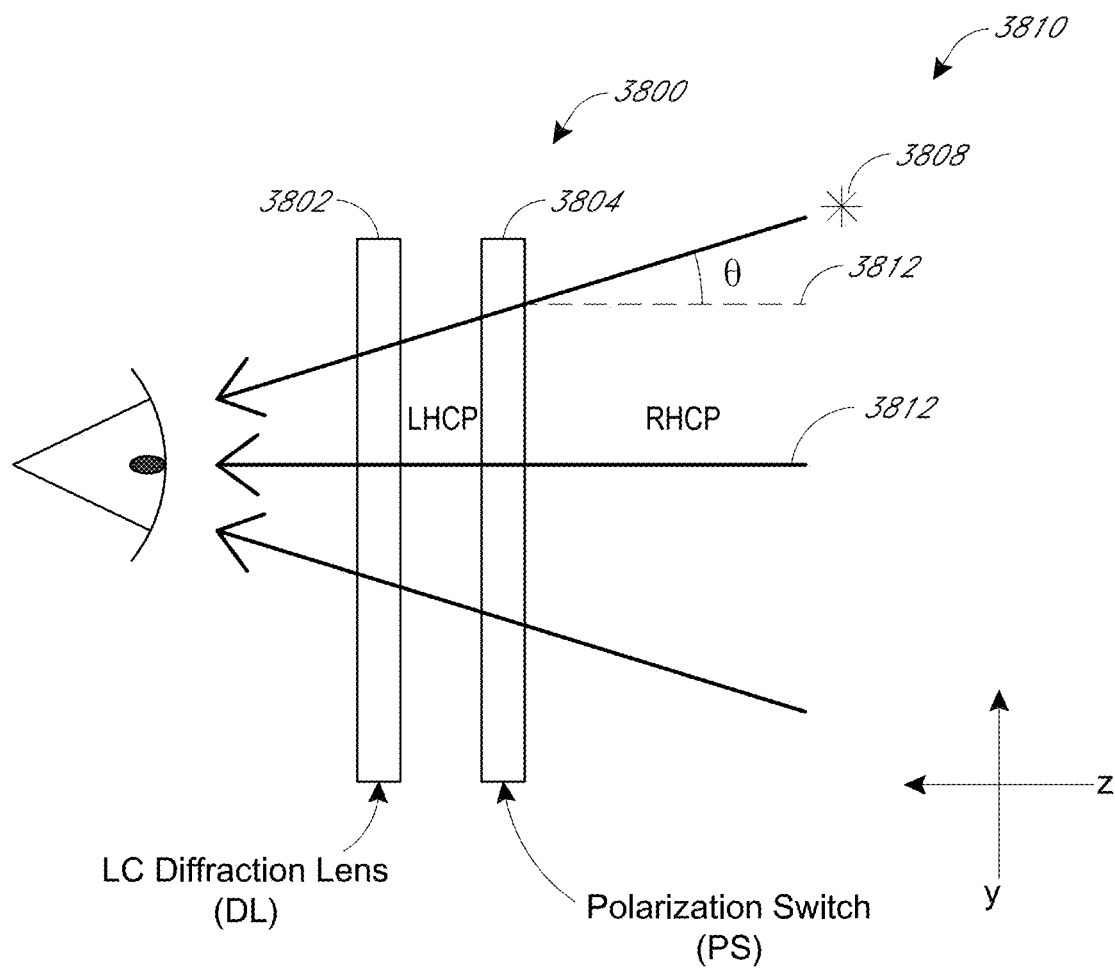
FIG. 17 illustrates an example of an adaptive lens assembly comprising waveplate lenses and a switchable waveplate receiving light from a wide field-of-view. Light from objects on the periphery of the field-of-view are incident on the switchable waveplate at an angle, which decreases the efficiency at which the polarization is converted/rotated.

FIG. 17 illustrates an example of an adaptive lens assembly 3800 comprising a liquid crystal lens (e.g., waveplate lens) 3802 such as a liquid crystal (LC) diffractive lens and a polarization switch (e.g., switchable waveplate including at least one layer of TN LC molecules) 3804 receiving light 3806 from a wide field-of-view. Light from objects 3808 on the periphery 3810 of the field-of-view are shown incident on the switchable waveplate 3804 at an angle, $\theta$. This angle of incidence, $\theta$, is measured with respect to a normal 3812 to the switchable waveplate 3804. The polarization switch 3800 may be configured such that when the polarization switch is in one state, the polarization switch rotates the polarization of light incident thereon. For example, right handed circularly polarized light (RHCP) incident on the polarization switch such as the switchable waveplate may be rotated into left handed circular polarized light (LHCP). Such effect may, for example, occur for light incident on the polarization switch or switchable waveplate 3804 at normal incidence thereto. Light having a larger angle of incidence, $\theta$, may not completely be converted from right handed polarized light to left hand polarized light.

Accordingly, light from off-axis objects 3808, for example, in the periphery 3810 of the field-of-view that is incident on the polarization switch 3804 at an angle, $\theta$, greater than zero, may not experience complete conversion of the polarization (e.g., from right hand circularly polarized light to left hand circularly polarized light). The result may be non-uniform treatment of light directed from different regions of the field-of-view onto the polarization switch 3804 and adaptive lens assembly 3800. This adaptive lens produces ghost images at the wrong depth plane when such an element is used as a variable focus element for an augmented reality device. Therefore there is a need to increase the field-of-view of switchable waveplates such as those shown in FIG. 17.

Figure 18:
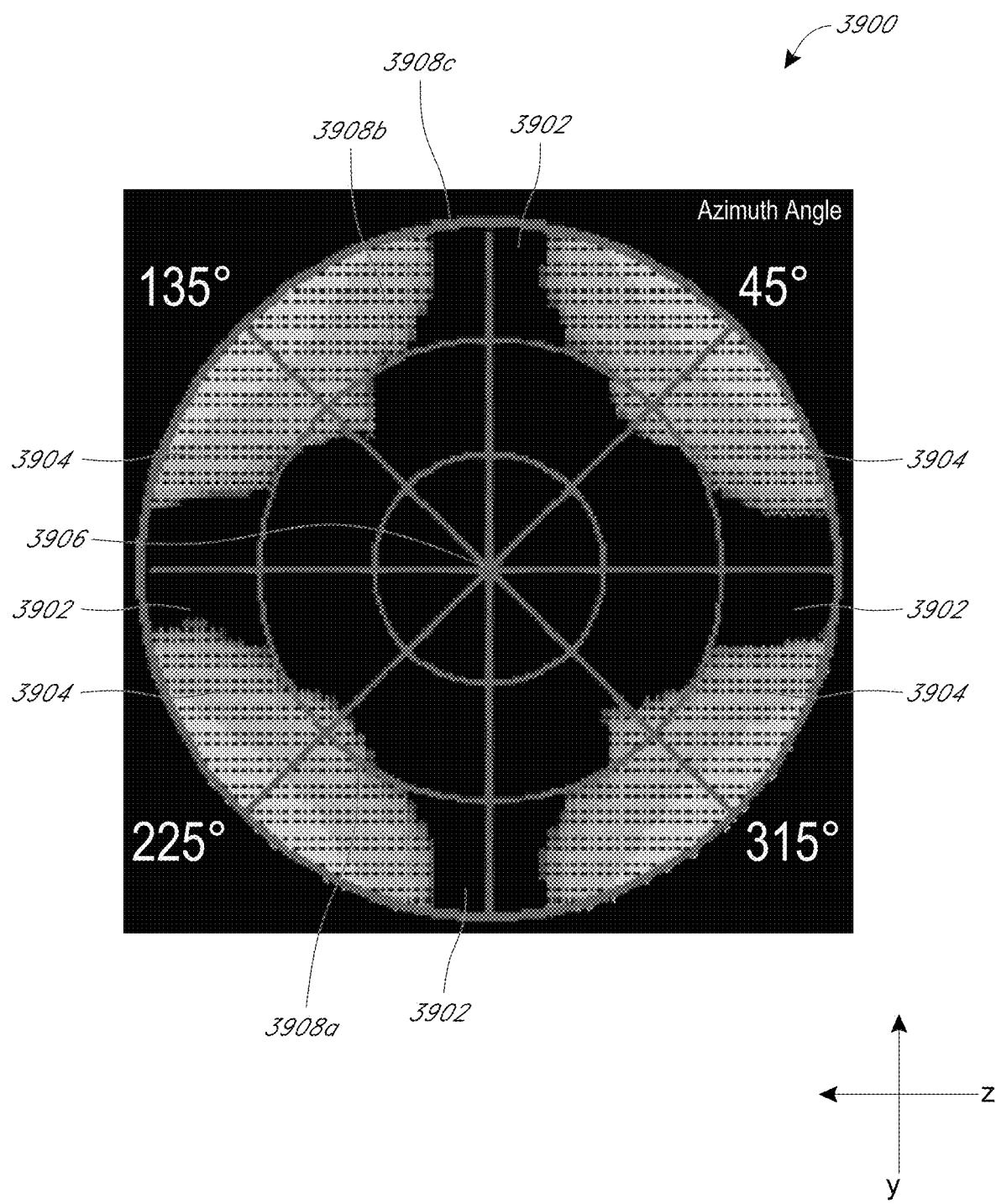
FIG. 18 is a plot that illustrates the efficiency at which the switchable waveplate converts/rotates polarization at different angles of light incident thereon. The bright portions (e.g., at the periphery) indicate reduced efficiency.

FIG. 18 shows an example of this non-uniformity. FIG. 18 is a plot 3900 that illustrates the efficiency at which an example LC layer of the switchable waveplate 3804 converts polarization at different angles of light incident thereon. This contour plot is the simulated percentage of light leaking through parallel circular polarizers with an Electrically Controlled Birefringence (ECB) LC cell in between. An ECB LC cell is a simple switchable waveplate, where the LC molecules are all aligned parallel in the same direction, i.e. along x axis in the coordinate system shown. Typically the thickness of the LC layer (d) is chosen such that $\Delta n*d=\lambda_c/2$, where $\Delta n$ is the LC birefringence, $\lambda_c$ is the center wavelength. When no external voltage is applied, this LC cell can convert right handed circularly polarized light into left hand circularly polarized light, and vice versa. The amount of conversion can be measured as the % of light leakage through parallel circular polarizers over the field-of-view. The coordinate system is a polar coordinate system that maps polarization conversion or rotation efficiency for different angles of incident light on the polarization switch or switchable waveplate 3804. The center 3906 corresponds to light normally incident on the polarization switch or switchable waveplate 3804, for example, along a central or optical axis through the polarization switch or switchable waveplate. Azimuthal angles of 45, 135, 225, and 315 degrees are marked. The polar grid also has circles 3908a, 3908b, and 3908c representing 10, 20, and 30 degrees of elevation angle with respect to the central axis or optical axis through the example TN LC layer of the polarization switch or switchable waveplate 3804.

The substantial dark regions 3902 of the plot shows that for much of the light at different angles, the polarization is efficiently converted or rotated. However, some light regions 3904 of the plot show that for some of the light at higher angles corresponding to less central regions of the field-of-view, the polarization is not as efficiently converted or rotated. Various polarization switches or switchable waveplate designs disclosed herein are configured to provide more efficient polarization conversion/rotation for various high angles corresponding to more peripheral locations 3810 in the field-of-view.

Figure 19:
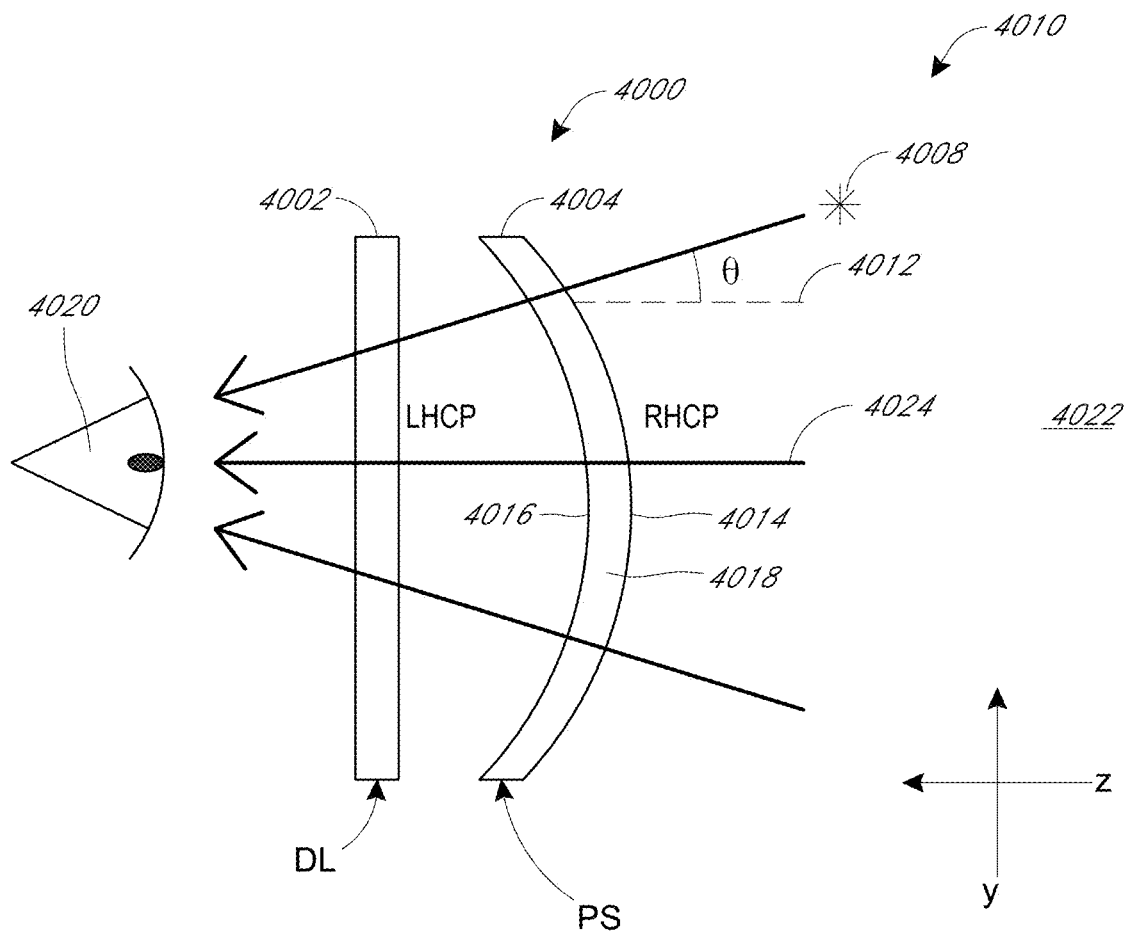
FIG. 19 illustrates an example design for a switchable waveplate configured to increase the efficiency of polarization conversion/rotation for light from objects on the periphery of the field-of-view. The switchable waveplate is curved such that light is incident on the switchable close to normal for off-axis objects.

FIG. 19 illustrates one such design configured to increase the efficiency of polarization conversion or rotation for light from objects on the periphery of the field-of-view. In particular, FIG. 19 shows an example of an adaptive lens assembly 4000 comprising liquid crystal lens (e.g., waveplate lens) 4002 such as a liquid crystal (LC) diffractive lens and a polarization switch (e.g., switchable waveplate) 4004, wherein the switchable waveplate is curved. Namely, the polarization switch or switchable waveplate 4004 is curved such that light is incident on the switchable waveplate close to normal or more close to normal (as compared to a flat switchable waveplate) for light 4006 from a wide field-of-view. Light from objects 4008 on the periphery 4010 of the field-of-view are shown incident on the switchable waveplate 4004 at an angle, θ. This angle of incidence, θ, is measured with respect to a normal 4012 to the switchable waveplate 4004. The polarization switch or switchable waveplate 4004 is shown as receiving this light incident at an angle, θ, as normally or substantially normally incident on said polarization switch.

The polarization switch or switchable waveplate 4004 has first and second surfaces 4014, 4016 (e.g., outer and inner surfaces) and a liquid crystal layer 4018 disposed therebetween. The first and second surface 4014, 4016, in this example are concave from the perspective of a viewer's eye 2020 and convex with respect to the world 2022. The first and second surfaces 4014, 4016 may be spherically shaped or may have other curved shapes. The first and second surfaces 4014, 4016, may have the same or similar curvatures in some implementations, but are not so limited. Other curvatures and shapes are possible.

FIG. 19 shows the liquid crystal layer 4018 disposed between said first and second curved surfaces 4014, 4016 as curved as well. The liquid crystal layer 4018 may similarly be curved such that the LC layer is concave with respect to the viewer's eye 4020 and convex with respect to the world 4022. The liquid crystal layer 4018 may be spherically shaped in some implementations but need not be so limited.

The curvature of the polarization switch or switchable waveplate 4004 shown in FIG. 19 is such that light incident angle of incidence, θ, is normally or substantially normally incident on a first outer surface 4014 of the polarization switch 4004. Similarly, the liquid crystal layer 4018 may comprise liquid crystal comprising a plurality of liquid crystal molecules that are longer than wide along a longitudinal direction, and the direction of incident light may be orthogonal to the longitudinal direction of the molecules that the light is incident thereon. Likewise, the liquid crystal molecules may have a side along the longitudinal direction that faces the incident light. In some case, the side of the liquid crystal molecule on which the light is incident may be normal or near normal to the incident light. With the light being more consistently incident on the polarization switch 4004 and the liquid crystal molecules at the same or similar angles, the polarization conversion or rotation may be more uniform across the polarization switch. The polarization conversion or rotation of light incident along a central axis 4024 (e.g., optical axis) through said polarization switch (e.g., through said first and second surfaces 4014, 4016 and said liquid crystal layer 4018) may be similar to the polarization conversion or rotation for off-axis light coming from objects 4008 located at the periphery 4010 of the field-of-view. This result may be a consequence of the curvature of the polarization switch 4004 and the liquid crystal layer 4018, which increases the likelihood that the angle of incidence of light from different objects in the field-of-view is substantially the same (e.g., about normal).

In various implementations, the first and second curved surfaces 4014, 4016 on the switchable waveplate 4004 comprise curved surfaces on curved substrates (not shown). For example, the liquid crystal layer 4018 may be disposed between first and second curved substrates. These curves substrates may provide the first and second (outer and inner) curved surfaces 4014, 4016 referenced above. The substrates may comprise glass or plastic material. The substrate may comprise an optical element, such as quarter waveplates in some implementations.

The polarization switch or switchable waveplate 4004 may further comprise a plurality of electrodes (not shown) to apply an electrical signal across said curved liquid crystal layer 4018. This electrical signal may be used to switch the state of the liquid crystal and the polarization switch or switchable waveplate 4004. Accordingly, the polarization switch 4004 may be configured such that when the polarization switch is in one state, the polarization of light incident thereon is rotate or otherwise converted into a different polarization state. For example, right handed circularly polarized light (RHCP) incident on the polarization switch or switchable waveplate 4004 may be converted into left handed circular polarized light (LHCP). However, when the polarization switch 4004 is in another state, such conversion or rotation generally does not occur.

Figure 20:
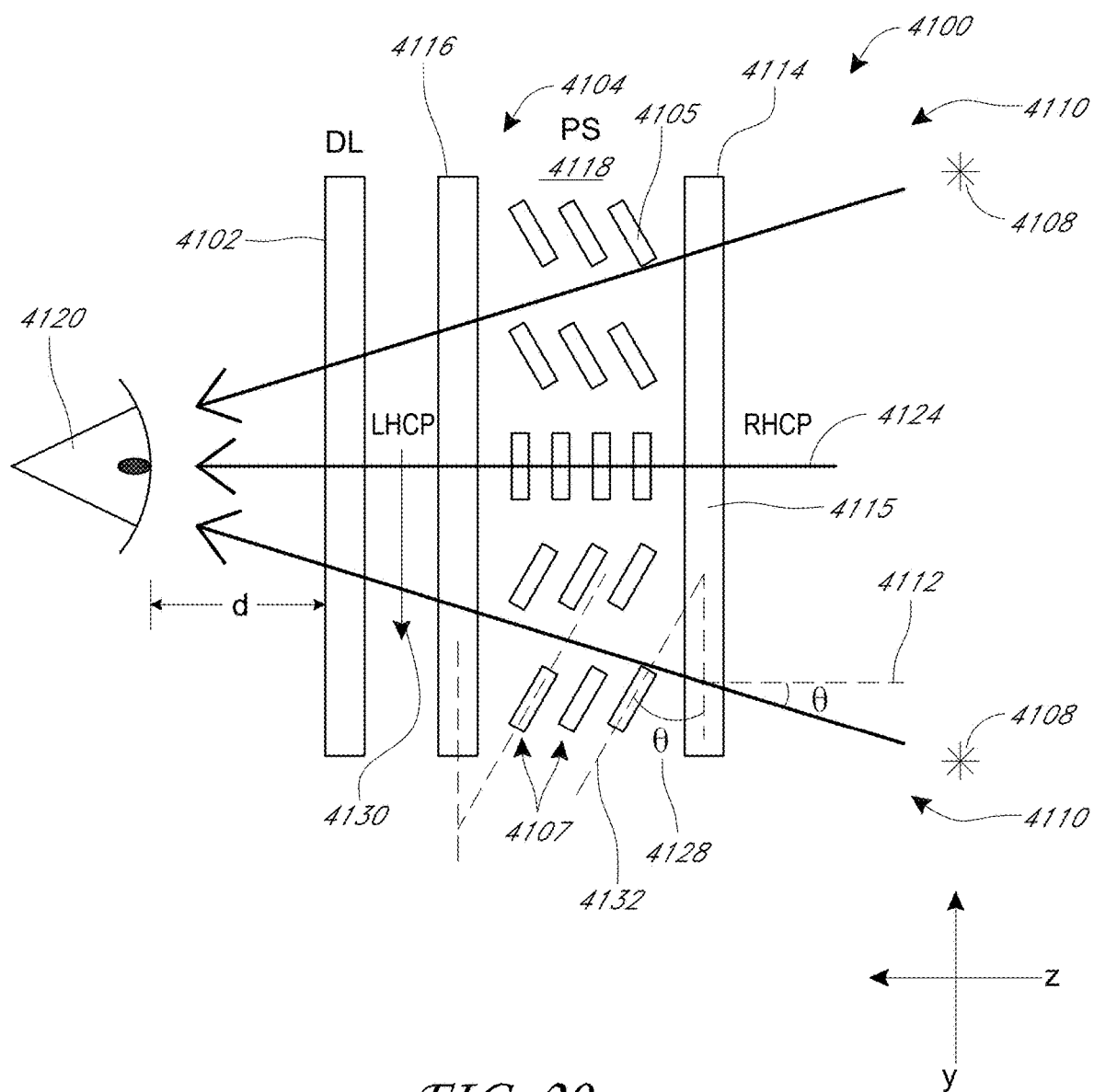
FIG. 20 illustrates another example design for a switchable waveplate configured to increase the efficiency of polarization conversion/rotation for light from objects on the periphery of the field-of-view. The switchable waveplate includes a liquid crystal layer comprising molecules that are tilted with increasing outward radial distance from a central axis such that light is incident on the molecules closer to normal for off-axis objects.

FIG. 20 illustrates another example design for a switchable waveplate configured to increase the efficiency of polarization rotation for light from objects on the periphery of the field-of-view. The switchable waveplate, however, is not curved but flat or planar. Such a configuration may make the switchable waveplate more compact and/or easier to fabricate. To provide for increased efficiency of polarization conversion or rotation, the polarization switch comprises liquid crystal comprising molecules that are tilted with increasing outward radial distance such that light is incident on the molecules closer to normal for off-axis objects.

FIG. 20, in particular, shows an example of an adaptive lens assembly 4100 comprising liquid crystal lens (e.g., waveplate lens) 4102 such as a liquid crystal (LC) diffractive lens and a polarization switch (e.g., switchable waveplate) 4104, wherein the switchable waveplate is flat or planar instead of being curved. Light from objects 4108 on the periphery 4110 of the field-of-view are shown incident on the switchable waveplate 4104 at an angle, θ. This angle of incidence, θ, is measured with respect to a normal 4112 to the switchable waveplate 4104.

The polarization switch or switchable waveplate 4104 has first and second surfaces 4114, 4116 (e.g., outer and inner surfaces) and a liquid crystal layer 4118 disposed therebetween. The first and second surfaces 4114, 4116, in this example, are flat or planar.

FIG. 20 shows the liquid crystal layer 4118 comprising a plurality of layers 4107 of molecules 4105 disposed between the first and second curved surfaces 4114, 4116. As schematically illustrated, the plurality of liquid crystal molecules 4105 can be oriented at angles 4128 that vary with outward radial distance 4130 from a central axis or optical axis 4124 through the first and second surfaces 4114, 4116 and the liquid crystal layer 4118 in a plurality of radial directions. In particular, the plurality of liquid crystal molecules 4105 may vary in tilt, for example, increase in tilt, with respect to the first and second surfaces 4114, 4116 with outward radial distance 4130 from the central axis or optical axis 4124 in the plurality of radial directions. In various implementations such as the one shown in FIG. 20, the central axis or optical axis 4124 is normal to said first and second surfaces.

In some configurations, for example, the adaptive lens assembly 4100 is configured to transmit light to a viewer's eye 4120 located at a distance, d, from said adaptive lens assembly and the plurality of liquid crystal molecules 4105 have tilt angles 4128 that match respectively the angle of incidence, θ, of light propagating along a path 4130 from locations 4108 in a field of view of the viewer's eye to the viewer's eye. Similarly, the molecules 4105 may be longer than wide in a longitudinal direction 4132. This longitudinal direction 4132 may be tilted at an angle 4128 with respect to the first and/or second surfaces 4114, 4116 that matches the angle of incidence, θ, of the incident light or the path 4130 from the object 4108 in the field of view to the eye 4120. Or in some implementations, the longitudinal direction 4132 of the molecules 4105 may be tilted at an angle 4128 that increases with outward radial distance 4130 from the central axis 4124 in the plurality of radial directions.

In some designs, such as for example, those described in FIGS. 19 and 20, the plurality of liquid crystal molecules having said tilt that may increase with outward radial distance from a central axis in radial direction include at least 50%, 60%, 70%, 80% 90%, 95% or more (or a percentage in any range defined by any of these values) of the molecules extending over a range of at least 1, 2, 3, 4, 5, 6, 8, 10, 12 cm$^2$ or more (or any range defined by any of these values) across the liquid crystal layer and/or waveplate. In various implementations the arrangement of liquid crystal molecules with the longitudinal direction forms a pattern that is symmetric with respect to an axis. This pattern my for example have at least 3-fold, 4-fold, 5-fold, 6-fold, 7-fold, 8-fold, 9-fold, 10-fold, 11-fold, 12-fold, or 20-fold rotational symmetry with respect to the axis (e.g., central axis) or may include ranges between any of these values.

FIG. 20 is a cross-sectional view that shows a cross-section of the polarization switch and the liquid crystal layer 4118 in the y-z plane. The liquid crystal molecules 4105 are thus shown tilted a plane parallel to the y-z plane. This tilt increases with outward radial distance 4130 from the central axis 4124, for example, in radial direction parallel to the y axis. In various implementations, however, the tilt of the liquid crystal molecules 4105 increase with outward radial distance 4130 from the central axis 4124 in other radial directions. For example, the tilt of the liquid crystal molecules 4105 may increase with outward radial distance 4130 from the central axis 4124 in radial direction(s) that are at oblique (non-parallel and non-perpendicular) angles (e.g., 20°, 30°, 40°) with respect to the y axis (and the orthogonal x-axis), for example, in part out of the paper.

Accordingly, the liquid crystal molecules 4105 may have a side along the longitudinal direction 4132 that faces the incident light. In some cases, the side of the liquid crystal molecule 4105 on which the light is incident may be normal or near normal to the incident light. As discussed above, in some cases, the direction of incident light may be orthogonal to the longitudinal direction 3132 of the molecules that the light is incident thereon. With the light being more consistently incident on the liquid crystal molecules 4105 at the same or at least more similar angles (e.g., than if the molecules are oriented the same direction for all outward radial distances 4130 from the central axis 4124), the polarization conversion or rotation may be more uniform across the polarization switch 4104. The polarization conversion or rotation of light incident along the central axis 4124 (e.g., optical axis) through said polarization switch 4104 (e.g., through said first and second surfaces 4114, 4116 and said liquid crystal layer 4118) may be similar to the polarization conversion or rotation for off-axis light coming from objects 4108 located at the periphery 4110 of the field-of-view. This result may be a consequence of the tilted orientation of the liquid crystal molecules 4105 (e.g., increasing tilt with radial distance from the central axis 4124), which increases the likelihood that the angle of incidence of light from different objects 4108 in the field-of-view is substantially the same (e.g., about normal).

In various implementations, the first and second surfaces 4114, 4116 on the switchable waveplate 4104 comprise surfaces on substrates 4115, 4117. For example, the liquid crystal layer 4118 may be disposed between first and second substrates 4115, 4117. In various implementations, such as the design shown in FIG. 20, the first and second surfaces 4114, 4116 comprise planar surfaces on planar substrates 4115, 4117. These substrates 4115, 4117 may provide the first and second (outer and inner) surfaces 4114, 4116 referenced above. The substrate 4115, 4117 may comprise glass or plastic material. The substrate 4115, 4117 may comprise an optical element, such as quarter waveplates in some implementations.

The polarization switch or switchable waveplate 4104 may further comprise a plurality of electrodes (not shown) to apply an electrical signal across said liquid crystal layer 4118. This electrical signal may be used to switch the state of the liquid crystal and the polarization switch or switchable waveplate 4104. Accordingly, the polarization switch 4104 may be configured such that when the polarization switch is in one state, the polarization of light incident thereon is rotated or otherwise converted into a different polarization state. For example, right handed circularly polarized light (RHCP) incident on the polarization switch or switchable waveplate 4104 may be rotated or converted into left handed circular polarized light (LHCP). However, when the polarization switch 4104 is in another state, such conversion or rotation generally does not occur.

Various methods may be employed to fabricate optical elements comprising liquid crystals, such as the switchable waveplate 4104 shown in FIG. 20 having tilted liquid crystal molecules 4105. As further illustrated in FIG. 20, liquid crystal molecules 4105 may be tilted at varying amounts of inclination with respect to substrates 4115 and 4117 on either side of the liquid crystal layer 4118. Various methods may be used to orient such liquid crystal molecules 4104 and provide a desired amount of tilt 4128 with respect to the substrates 4115 and 4117. Examples of such fabrication methods are disclosed in U.S. Patent App. Pub. Nos. 2018/0143470 and 2018/0143485, both of which are incorporated herein by reference in their entirety.

Additionally, the methods can be used to vary the orientation of LC molecules and to create a wide variety of optical elements comprising liquid crystal including waveplates, such as switchable waveplates (e.g., equipped with electrodes to apply electrical signal to switch the state of the waveplate), broadband waveplates and waveplate lenses. Additionally, although such methods can be used to vary the orientation of LC molecules in an optical element such as a waveplates, the methods can be used for other types of optical elements. Variations in the methods for fabricating the optical elements are also possible. For example, imprint techniques such as nanoimprint techniques, variation in the fabrication technique, and other approaches and fabrication techniques may be employed.

EXAMPLES

Various Examples are Provided Below

1. A switchable optical assembly comprising: a switchable waveplate configured to be electrically activated and deactivated to selectively alter the polarization state of light incident thereon, said switchable waveplate comprising: first and second curved surfaces; a liquid crystal layer disposed between said first and second curved surfaces such that said liquid crystal layer is curved; and a plurality of electrodes to apply an electrical signal across said curved liquid crystal layer.

2. The switchable optical assembly of Example 1, wherein the first and second curved surfaces on the switchable waveplate comprise curved surfaces on curved substrates.

3. The switchable optical assembly of any of the Examples above, wherein the first and second curved surfaces have curvatures that are the same.

4. The switchable optical assembly of any of the Examples above, wherein the switchable optical assembly further comprises a first waveplate lens comprising a liquid crystal layer, said first waveplate lens having different optical power for different polarizations of light incident thereon; wherein the switchable optical assembly is configured to be selectively switched between at least two lens states including: a first lens state configured to have a first optical power; and a second lens state configured to have a second optical power different that said first optical power.

5. The switchable optical assembly of Examples 4, wherein the second optical power is zero optical power.

6. A switchable optical assembly comprising: a switchable waveplate configured to be electrically activated and deactivated to selectively alter the polarization state of light incident thereon, said switchable waveplate comprising: first and second surfaces; a liquid crystal layer disposed between said first and second surfaces, said liquid crystal layer comprising a plurality of liquid crystal molecules that vary in tilt with respect to said first and second surfaces with outward radial distance from an axis through said first and second surfaces and said liquid crystal layer in a plurality of radial directions; and a plurality of electrodes to apply an electrical signal across said liquid crystal layer.

7. The switchable optical assembly of Example 6, wherein the first and second surfaces comprise planar surfaces.

8. The switchable optical assembly of any of Examples 6-7, wherein the first and second surfaces comprise planar surfaces on planar substrates.

9. The switchable optical assembly of any of Examples 6-8, wherein the axis is normal to said first and second surfaces.

10. The switchable optical assembly of any of Examples 6-9, wherein said plurality of liquid crystal molecules increase in tilt with respect to said first and second surfaces with outward radial distance from said axis in said plurality of radial directions.

11. The switchable optical assembly of any of Examples 6-10 configured to transmit light to a viewer's eye located at a distance from said switchable optical assembly, wherein said plurality of liquid crystal molecules have tilt angles that match respectively the angle of incidence of light propagating along a path from locations in a field of view of the viewer's eye to the viewer's eye.

12. The switchable optical assembly of any of Examples 6-11, wherein said plurality of liquid crystal molecules have orientations such that said plurality of liquid crystal molecules are arranged in a rotationally symmetric arrangement about said axis.

13. The switchable optical assembly of any of Examples 6-11, wherein said plurality of liquid crystal molecules have orientations such that said plurality of liquid crystal molecules have at least 4 fold rotational symmetry about said axis.

14. The switchable optical assembly of any of Examples 6-13, wherein the switchable optical assembly further comprises a first waveplate lens comprising a liquid crystal layer, said first waveplate lens having different optical power for different polarizations of light incident thereon; wherein the switchable optical assembly is configured to be selectively switched between at least two lens states including: a first lens state configured to have a first optical power; and a second lens state configured to have a second optical power different than said first optical power.

15. The switchable optical assembly of claim 14, wherein the second optical power is zero optical power.

16. The switchable optical assembly of Examples 6-15, wherein the plurality of liquid crystal molecules that vary in tilt with respect to said first and second surfaces with outward radial distance from said axis in a plurality of radial directions include at least 50% of the molecules extending over a range of at least 1 cm$^2$ across said first layer.

17. The switchable optical assembly of Examples 6-15, wherein the plurality of liquid crystal molecules that vary in tilt with respect to said first and second surfaces with outward radial distance from said axis in a plurality of radial directions include at least 50% of the molecules extending over a range of at least 2 cm$^2$ across said first layer.

18. The switchable optical assembly of Examples 6-15, wherein the plurality of liquid crystal molecules that vary in tilt with respect to said first and second surfaces with outward radial distance from said axis in a plurality of radial directions include at least 80% of the molecules extending over a range of at least 1 cm$^2$ across said first layer.

19. The switchable optical assembly of Examples 6-15, wherein the plurality of liquid crystal molecules that vary in tilt with respect to said first and second surfaces with outward radial distance from said axis in a plurality of radial directions include at least 80% of the molecules extending over a range of at least 2 cm$^2$ across said first layer.

20. The switchable optical assembly of Examples 6-19, wherein said axis includes a central axis through said first and second surfaces and said liquid crystal layer. Various additional examples are provided below.

21. An optical assembly comprising: a waveplate comprising: first and second curved surfaces; and a liquid crystal layer disposed between said first and second curved surfaces such that said liquid crystal layer is curved.

22. The optical assembly of Example 21, wherein the first and second curved surfaces on the waveplate comprise curved surfaces on curved substrates.

23. The optical assembly of Examples 21-22, wherein the first and second curved surfaces have curvatures that are the same.

24. The optical assembly of Examples 21-23, wherein the optical assembly further comprises a first waveplate lens comprising a liquid crystal layer, said first waveplate lens having different optical power for different polarizations of light incident thereon.

25. An optical assembly comprising: a waveplate comprising: first and second surfaces; and a liquid crystal layer disposed between said first and second surfaces, said liquid crystal layer comprising a plurality of liquid crystal molecules that vary in tilt with respect to said first and second surfaces with outward radial distance from an axis through said first and second surfaces and said liquid crystal layer in a plurality of radial directions.

26. The optical assembly of Example 25, wherein the first and second surfaces comprise planar surfaces.

27. The optical assembly of any of Examples 25-26, wherein the first and second surfaces comprise planar surfaces on planar substrates.

28. The optical assembly of any of Examples 25-27, wherein the axis is normal to said first and second surfaces.

29. The optical assembly of any of Examples 25-28, wherein said plurality of liquid crystal molecules increase in tilt with respect to said first and second surfaces with outward radial distance from said axis in said plurality of radial directions.

30. The optical assembly of any of Examples 25-29, configured to transmit light to a viewer's eye located at a distance from said optical assembly, wherein said plurality of liquid crystal molecules have tilt angles that match respectively the angle of incidence of light propagating along a path from locations in a field of view of the viewer's eye to the viewer's eye.

31. The optical assembly of any of Examples 25-30, wherein said plurality of liquid crystal molecules have orientations such that said plurality of liquid crystal molecules are arranged in a rotationally symmetric arrangement about said axis.

32. The optical assembly of any of Examples 25-30, wherein said plurality of liquid crystal molecules have orientations such that said plurality of liquid crystal molecules have at least 4 fold rotational symmetry about said axis.

33. The optical assembly of any of Examples 25-32, wherein the optical assembly further comprises a first waveplate lens comprising a liquid crystal layer, said first waveplate lens having different optical power for different polarizations of light incident thereon.

34. The optical assembly of Examples 25-33, wherein the plurality of liquid crystal molecules that vary in tilt with respect to said first and second surfaces with outward radial distance from said axis in a plurality of radial directions include at least 50% of the molecules extending over a range of at least 1 cm$^2$ across said first layer.

35. The optical assembly of Examples 25-33, wherein the plurality of liquid crystal molecules that vary in tilt with respect to said first and second surfaces with outward radial distance from said axis in a plurality of radial directions include at least 50% of the molecules extending over a range of at least 2 cm$^2$ across said first layer.

36. The optical assembly of Examples 25-33, wherein the plurality of liquid crystal molecules that vary in tilt with respect to said first and second surfaces with outward radial distance from said axis in a plurality of radial directions include at least 80% of the molecules extending over a range of at least 1 cm$^2$ across said first layer.

37. The optical assembly of Examples 25-33, wherein the plurality of liquid crystal molecules that vary in tilt with respect to said first and second surfaces with outward radial distance from said axis in a plurality of radial directions include at least 80% of the molecules extending over a range of at least 2 cm$^2$ across said first layer.

38. The optical assembly of Examples 25-37, wherein said axis includes a central axis through said first and second surfaces and said liquid crystal layer.

Additional Considerations

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. For example, referring to FIG. 15, it will be appreciated that one or more adaptive lens assemblies 1504-1 to 1504-3 may be disposed between individual ones of the waveguides 1012a, 1012b, and/or 1012c.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A switchable optical assembly comprising:
   a switchable waveplate configured to be electrically activated and deactivated to selectively alter the polarization state of light incident thereon, the switchable waveplate comprising:
   first and second surfaces;
   a liquid crystal layer disposed between the first and second surfaces, the liquid crystal layer comprising a plurality of liquid crystal molecules that increase in tilt with respect to the first and second surfaces with outward radial distance from an axis through the first and second surfaces and the liquid crystal layer in a plurality of radial directions; and
   a plurality of electrodes to apply an electrical signal across the liquid crystal layer,
   wherein the plurality of liquid crystal molecules that increase in tilt with respect to the first and second surfaces with outward radial distance from the axis include at least 50% of the molecules extending over a range of at least 1 cm² across the liquid crystal layer.

2. The switchable optical assembly of claim 1, wherein at least one of the first surface and the second surface is a planar surface.

3. The switchable optical assembly of claim 1, wherein at least one of the first surface and the second surface is a planar surface on a planar substrate.

4. The switchable optical assembly of claim 1, wherein the axis is normal to the first and second surfaces.

5. The switchable optical assembly of claim 1, wherein the switchable optical assembly is configured to transmit light to an eye of a viewer, the eye located at a distance from the switchable optical assembly, wherein the plurality of liquid crystal molecules have tilt angles that match respectively the angle of incidence of light propagating along a path to the eye from locations in a field of view of the eye.

6. The switchable optical assembly of claim 1, wherein the plurality of liquid crystal molecules have orientations such that the plurality of liquid crystal molecules are arranged in a rotationally symmetric arrangement about the axis.

7. The switchable optical assembly of claim 1, wherein the plurality of liquid crystal molecules have orientations such that the plurality of liquid crystal molecules have at least 4 fold rotational symmetry about the axis.

8. The switchable optical assembly of claim 1, wherein the switchable optical assembly further comprises a first waveplate lens comprising another liquid crystal layer, the first waveplate lens having different optical power for different polarizations of light incident thereon, and wherein the switchable optical assembly is configured to be selectively switched between at least two lens states including:
   a first lens state configured to have a first optical power; and
   a second lens state configured to have a second optical power different than the first optical power.

9. The switchable optical assembly of claim 8, wherein the second optical power is zero optical power.

10. The switchable optical assembly of claim 1, wherein the plurality of liquid crystal molecules that increase in tilt with respect to the first and second surfaces with outward radial distance from the axis in a plurality of radial directions include at least 70% of the molecules extending over a range of at least 1 cm² across the liquid crystal layer.

11. The switchable optical assembly of claim 1, wherein the plurality of liquid crystal molecules that increase in tilt with respect to the first and second surfaces with outward radial distance from the axis in a plurality of radial directions include at least 70% of the molecules extending over a range of at least 2 cm² across the liquid crystal layer.

12. The switchable optical assembly of claim 1, wherein the plurality of liquid crystal molecules that increase in tilt with respect to the first and second surfaces with outward radial distance from the axis in a plurality of radial directions include at least 80% of the molecules extending over a range of at least 1 cm² across the liquid crystal layer.

13. The switchable optical assembly of claim 1, wherein the plurality of liquid crystal molecules that increase in tilt with respect to the first and second surfaces with outward radial distance from the axis in a plurality of radial directions include at least 80% of the molecules extending over a range of at least 2 cm² across the liquid crystal layer.

14. The switchable optical assembly of claim 1, wherein the axis is a central axis through the first and second surfaces and the liquid crystal layer.

15. The switchable optical assembly of claim 1, wherein at least one of the first surface and the second surfaces is a curved surface.

* * * * *